United States Patent
Lai et al.

(10) Patent No.: US 11,599,800 B2
(45) Date of Patent: Mar. 7, 2023

(54) SYSTEMS AND METHODS FOR ENHANCED USER SPECIFIC PREDICTIONS USING MACHINE LEARNING TECHNIQUES

(71) Applicant: Color Genomics, Inc., Burlingame, CA (US)

(72) Inventors: Carmen Lai, San Francisco, CA (US); Jill Hagenkord, Los Altos, CA (US); Katsuya Noguchi, San Francisco, CA (US)

(73) Assignee: Color Genomics, Inc., Burlingame, CA (US)

( * ) Notice: Subject to any disclaimer, the term of this patent is extended or adjusted under 35 U.S.C. 154(b) by 74 days.

(21) Appl. No.: 16/774,307

(22) Filed: Jan. 28, 2020

(65) Prior Publication Data

US 2021/0232934 A1    Jul. 29, 2021

(51) Int. Cl.
*G06N 3/12* (2006.01)
*G06N 20/00* (2019.01)
*G06N 3/126* (2023.01)

(52) U.S. Cl.
CPC ............ *G06N 3/126* (2013.01); *G06N 20/00* (2019.01)

(58) Field of Classification Search
CPC ............................... G06N 3/126; G06N 20/00
See application file for complete search history.

(56) References Cited

U.S. PATENT DOCUMENTS

| | | | |
|---|---|---|---|
| 2019/0006048 A1* | 1/2019 | Gupta | G16H 20/10 |
| 2019/0243944 A1* | 8/2019 | Jain | G16H 50/70 |
| 2019/0287681 A1* | 9/2019 | Sathe | G06N 20/20 |
| 2019/0371443 A1* | 12/2019 | Petricoin, III | G16H 10/60 |
| 2020/0227134 A1* | 7/2020 | Kazemi Oskooei | G16B 25/10 |
| 2020/0357526 A1* | 11/2020 | Odiz | G16H 10/60 |

OTHER PUBLICATIONS

Liu et al. ("Anti-cancer Drug Response PredictionUsing Neighbor-Based Collaborative Filtering with Global Effect Removal"., Molecular Therapy: Nucleic Acids vol. 13, Dec. 2019, pp. 303-311) (Year: 2019).*

Kugaonkar et al. ("Finding Associations among SNPs for Prostate Cancer using Collaborative Filtering", DTMBIO'12, Oct. 29, 2021, pp. 57-60) (Year: 2012).*

Kim et al. ("Chronic Disease Prediction Using Character-Recurrent Neural Network in the Presence of Missing Information", Appl. Sci, 9, 2170, 2019, pp. 1-17) (Year: 2019).*

Davis et al. ("Time to CARE: a collaborative engine for practical disease prediction", Data Min Knowl Disc 20, 2010, pp. 388-415) (Year: 2010).*

Irshad et al. ("A Molecular Signature Predictive of Indolent Prostate Cancer", www.ScienceTranslationalMedicine.org, vol. 5, Issue 202, Sep. 11, 2013, pp. 1-13) (Year: 2013).*

\* cited by examiner

*Primary Examiner* — Miranda M Huang
*Assistant Examiner* — Robert Lewis Kulp
(74) *Attorney, Agent, or Firm* — Kilpatrick Townsend & Stockton LLP

(57) ABSTRACT

Data sets can be processed using machine learning or artificial intelligence models to generate outputs predictive of a degree to which performing a protocol can positively modify an expected result associated with a condition. Generating the output may include accessing a user data set, inputting the user data set into a trained machine learning model to generate an output, and selecting an incomplete subset of a set of genes based on the output.

23 Claims, 12 Drawing Sheets

| Attribute | Condition A | Condition B | Condition C | Condition D | Condition E | Condition F | Condition G | Condition H |
|---|---|---|---|---|---|---|---|---|
| BRCA1 | Yes | Yes | No | No | No | Yes | No | Yes |
| BRCA2 | Yes | Yes | No | No | Yes | Yes | No | Yes |
| MLH1 | No | Yes | Yes | Yes | No | Yes | Yes | Yes |
| MSH2 | No | Yes | Yes | Yes | No | Yes | Yes | Yes |
| MSH6 | No | Yes | Yes | Yes | No | No | Yes | Yes |
| PMS2 | No | Yes | Yes | Yes | No | Yes | No | Yes |
| EPCAM | No | No | Yes | Yes | No | Yes | Yes | Yes |
| APC | No | No | No | Yes | No | No | Yes | No |
| MUTYH | No | No | No | Yes | No | No | No | No |
| MITF | No | No | No | No | Yes | No | No | No |
| BAP1 | No | No | No | No | Yes | Yes | No | No |
| CDKN2A | No | No | No | No | Yes | No | No | No |
| CDK4 | No | No | No | No | Yes | No | Yes | Yes |
| TP53 | Yes | Yes | Yes | Yes | No | Yes | No | No |
| PTEN | Yes | No | Yes | No | No | No | Yes | No |
| STK11 | Yes | Yes | Yes | Yes | No | Yes | Yes | No |
| CDH1 | Yes | No | No | No | No | No | Yes | No |
| BMPR1A | No | No | No | Yes | No | Yes | Yes | No |
| SMAD4 | No | No | No | Yes | No | Yes | No | No |
| GREM1 | No | No | No | Yes | No | No | No | No |
| POLD1 | No | No | No | Yes | No | No | No | No |
| POLE | No | No | No | Yes | No | Yes | No | No |
| PALB2 | Yes | Yes | No | No | No | No | No | Yes |
| CHEK2 | Yes | No | No | No | No | Yes | No | Yes |
| ATM | Yes | No | No | No | No | Yes | No | Yes |
| NBN | Yes | No | No | No | No | No | No | Yes |
| BARD1 | Yes | No | No | No | No | No | No | No |
| BRIP1 | Yes | Yes | No | No | No | No | No | No |
| RAD51C | No | Yes | No | No | No | No | No | No |
| RAD51D | No | Yes | No | No | No | No | No | No |

FIG. 5A

| Attribute | Condition W | Condition X | Condition Y | Condition Z |
|---|---|---|---|---|
| ACTA2 | No | No | Yes | No |
| ACTA1 | Yes | No | No | No |
| APOB | No | No | No | Yes |
| COL3A1 | No | No | Yes | No |
| DSC2 | Yes | No | No | No |
| DSG2 | Yes | No | No | No |
| DSP | Yes | No | No | No |
| FBN1 | No | No | Yes | No |
| GLA | Yes | No | No | No |
| KCNH2 | No | Yes | No | No |
| KCNQ1 | No | Yes | No | No |
| LDLR | No | No | No | Yes |
| LMNA | Yes | No | No | No |
| MYBPC3 | Yes | No | No | No |
| MYH7 | Yes | No | No | No |
| MYH11 | No | No | Yes | No |
| MYL2 | Yes | No | No | No |
| MYL3 | Yes | No | No | No |
| PCSK9 | No | No | No | Yes |
| PKP2 | Yes | No | No | No |
| PRKAG2 | Yes | No | No | No |
| RYR2 | No | Yes | No | No |
| SCN5A | No | Yes | No | No |
| SMAD3 | No | No | Yes | No |
| TGFBR1 | No | No | Yes | No |
| TGFBR2 | No | No | Yes | No |
| TMEM43 | Yes | No | No | No |
| TNNI3 | Yes | No | No | No |
| TNNT2 | Yes | No | No | No |
| TPM1 | Yes | No | No | No |

FIG. 5B

| User ID | Condition | Attribute | Positive User Outcome? |
|---|---|---|---|
| User1 | Condition 123 | Attribute A-1 | Yes |
| User1 | Condition 123 | Attribute A-2 | Yes |
| User1 | Condition 123 | Attribute B | No |
| User2 | Condition 123 | Attribute A-1 | Yes |
| User2 | Condition 123 | Attribute A-2 | No |
| User2 | Condition 123 | Attribute B | No |
| User3 | Condition 123 | Attribute A-1 | Yes |
| User3 | Condition 123 | Attribute A-2 | Yes |
| User3 | Condition 123 | Attribute B | Yes |

FIG. 6A

| Condition | Clinical Utility | Clinical Validity | | | | Unknown Clinical Implications |
|---|---|---|---|---|---|---|
| | Bin1: Clinically actionable in a general population - Known penetrance of genes | Bin2A: Clinically interesting, low risk | Bin2B: Clinically interesting, medium risk | Bin2C: Clinically interesting, high risk | Bin2D: Clinically actionable if in a high risk population (significant personal or family history) - Unknown penetrance of genes | Bin 3: Unknown clinical implications |
| Cancer | BRCA1, BRCA2, MLH1, MSH2, MSH6, EPCAM, PMS2 | | | | CDH1, APC, MUTYH, MITF, BAP1, CDKN2A, CDK4, TP53, PTEN, STK11, BMPR1A, SMAD4, GREM1, POLD1, POLE, PALB2, CHEK2, ATM, NBN, BARD1, BRIP1, RAD51C, RAD51D | |
| Cardio | LDLR, APOB, PCSK9 | | | | ACTA2, ACTC1, COL3A, DSC2, DSG2, DSP, FBN, GLA, KCNH2, KCNQ1, LMNA, MYBPC3, MYH11, MYH7, MYL2, MYL3, PKP2, PRKAG2, RYR2, SCN5A, SMAD3, TGFBR1, TGFBR2, TMEM43, TNNI3, TNNT2, TPM1 | |
| Other | | HFE, FVL, PT, PGx | Carrier status, APOE | PSEN1, PSEN2, APP, other neuro | | |

FIG. 6B

SYSTEMS AND METHODS FOR ENHANCED USER SPECIFIC PREDICTIONS USING MACHINE LEARNING TECHNIQUES

TECHNICAL FIELD

The present disclosure relates generally to methods and devices that execute machine learning and artificial intelligence models to enhance user specific predictions for panel selections. More specifically, but not by way of limitation, the present disclosure relates to systems and methods for executing machine learning or artificial intelligence models to generate data-driven and user specific predictions of whether or a degree to which a protocol is effective for positively modifying an expected result associated with a condition.

BACKGROUND OF THE INVENTION

Testing users to determine the genetic likelihood of having certain conditions typically involves sequencing a standard panel of genes. However, testing users for a standard panel of genes may not yield informative and relevant results. For example, certain actions, if performed, may successfully prevent a condition associated with a gene for some users, but not others. Thus, the standard panel does not take into account the user specific relevance or effectiveness of protocols that could prevent a condition. Additionally, data characterizing a user's diagnosed conditions are often incomplete or insufficient. Outcome improvements resulting from sequencing panels of genes for users can be misrepresented if the user's data is incomplete (referred to as the "thin data" problem).

BRIEF SUMMARY

Certain embodiments of the present disclosure relate to systems and methods for processing data sets using machine learning or artificial intelligence models to generate user specific predictions of a protocol's effectiveness in preventing a user's potential condition or positively modifying a user's existing condition. For example, a protocol may be any action that can be performed or not performed to facilitate the detection of a condition linked to a gene, to prevent the occurrence of a condition linked to a gene, or to positively modify an expected result of the condition (e.g., to improve the expected quality of life of the user or to prevent the user from experiencing an expected adverse event). A protocol's effectiveness or relevance for a user may indicate a degree to which the protocol can prevent or positively modify an expected result associated with the user's potential or existing condition, respectively. For example, an expected result associated with a condition may be an event expected to occur in the user during the trajectory or progression of the condition. Machine learning or artificial intelligence models can be trained to generate outputs that can be evaluated to predict protocol effectiveness for a specific user. The trained machine learning or artificial intelligence models can be executed to process user specific data sets. Processing the user specific data sets using the trained models may advantageously generate a prediction that is specific to the user. The user specific prediction can be predictive of whether or not a protocol associated with a particular condition would positively modify an expected result for that particular user. When the user specific prediction indicates an expectation that a protocol would be effective or relevant for the user, gene(s) associated with the user's existing or potential condition can be included in a user specific panel for testing. When the user specific prediction expects that a protocol would not be effective or relevant for the user (e.g., would not impact the likelihood of the user developing the condition), the gene(s) associated with the user's existing or potential condition may not be included in the panel for testing. The protocols that would be effective or relevant may be grouped or binned together to determine a user specific panel for testing.

In certain embodiments, the machine learning or artificial intelligence models may include segmentation systems or recommender systems for generating outputs predictive of a degree to which performing a protocol can positively modify an expected result associated with a condition for a particular user. Segmentation systems may include processes and devices that, for example, execute supervised, semi-supervised, or unsupervised machine learning techniques to generate outputs that segment or group a user data set associated with the user with other users to predict a degree to which protocols may positively modify an expected result associated with a user's existing or potential condition (e.g., a degree to which performing the protocol would have an impact on the user's likelihood of developing the condition). The segmentation systems may execute machine learning or artificial intelligence techniques to segment users based on data sets characterizing the user and data sets characterizing conditions. Additionally, recommender systems may include processes and devices that, for example, execute unsupervised learning techniques to segment or cluster users based on other users with similar features to predict a degree to which performing a protocol for the user can positively modify an expected result associated with a condition. The recommender systems may execute machine learning or artificial intelligence techniques to generate outputs that group users with similar users and determine protocol or panel recommendations based on the protocols that were effective or relevant for those similar users.

Non-limiting examples of advantages of using the machine learning or artificial intelligence models described herein for user specific panel selection may be that (1) the output of the trained models may be used to select a subset of genes from a standard panel or from multiple panels across different conditions in a manner that is specific (e.g., best suited to achieve positive outcomes) to a particular user; (2) the user feature values of new users added to the training data set can update feature weights or other parameters (e.g., hyperparameters of a machine learning model) of the model, thereby increasing the accuracy of the model's predictions; and (3) executing the model using the user data set may generate intermediate values, which may be useful or informative in selecting genes for the user specific panel.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by processing apparatus, cause the apparatus to perform the actions. One general aspect includes a computer-implemented method including: receiving, at a server, a first communication corresponding to a request to generate a value associated with a user, the value representing a degree to which a protocol is effective for positively modifying an expected result associated with a condition. The computer-implemented method also includes identifying a set of genes, each gene of the set of genes being associated with one or more conditions, and each condition of the one or more conditions having an expected result that is positively modifiable by performing a protocol. The computer-implemented method also includes accessing a user data set associated with the user, the user data set including one or more feature values that characterize the user; inputting the user data set into a trained machine learning model, the trained machine learning model having been trained to generate an output predictive of whether performing a protocol for an individual user will or is likely to positively modify an expected result associated with a condition, the trained machine learning model having been trained using a training data set associated with a plurality of other users, and the trained machine learning model including one or more intermediate values determined using the training data set; processing the user data set using the trained machine learning model, the processing including evaluating the one or more feature values of the user data set using the one or more intermediate values, the evaluation resulting in one or more weighted feature values being generated, and each weighted feature value of the one or more weighted feature values being associated with a gene of the set of genes; in response to processing the user data set using the trained machine learning model, generating an output corresponding to the requested value associated with the user, the output being an aggregation of each of the one or more weighted feature values, the output representing a degree to which performing the protocol for the user is predicted to positively modify the expected result of a condition. The computer-implemented method also includes selecting an incomplete subset of the set of genes, the selection of each gene included in the incomplete subset being based at least in part on the output generated for the user by the trained machine learning model. The computer-implemented method also includes generating a second communication including the incomplete subset specific to the user. The computer-implemented method also includes transmitting the second communication responsive to receiving the first communication. Other embodiments of this aspect include corresponding computer systems, apparatus, and computer programs recorded on one or more computer storage devices, each configured to perform the actions of the methods.

Implementations may include one or more of the following features. The computer-implemented method further including: performing a clustering operation on the training data set, the performance of the clustering operation forming one or more clusters of users, each cluster of the one or more clusters representing one or more users of the plurality of other users that share a common feature. The computer-implemented method may also include calculating a similarity metric between the user and the one or more users of each cluster of the one or more clusters, the similarity metric being calculated by mapping the one or more features characterizing the user to each cluster of the one or more clusters. The computer-implemented method may also include selecting the incomplete subset based on at least a portion of the training data set that corresponds to a cluster associated with a highest similarity metric. The computer-implemented method where the similarity metric is calculated using one or more collaborative filtering techniques. The computer-implemented method where the trained machine learning model is a decision tree model, where processing the user data set using the decision tree model results in generating one or more feature nodes, each feature node of the one or more feature nodes being associated with an expected value learned during training. The computer-implemented method may further include accessing an additional user data set corresponding to an additional user. The computer-implemented method may also include inputting the additional user data set into the trained machine learning model. The computer-implemented method may also include processing the additional user data set using the trained machine learning model. The computer-implemented method may also include generating an additional output in response to processing the additional user data set using the trained machine learning model. The computer-implemented method may also include selecting an additional incomplete subset of the subset of genes, where the additional incomplete subset is selected based on the additional output generated by the trained machine learning model, and where the additional incomplete subset includes one or more genes that are different from the incomplete subset associated with the user. The computer-implemented method further including: generating the training data set by: retrieving a first data set representing one or more previously determined outcome variables associated with each of the plurality of other users, each previously determined outcome variable of the one or more previously determined outcome variables indicating an outcome of performing the protocol for a user of the plurality of other users; retrieving a second data set representing one or more previously determined measurement variables associated with each of the plurality of other users, each previously determined measurement variable of the one or more previously determined measurement variables indicating a measured data point associated with a user of the plurality of other users. The computer-implemented method may also include combining each of the first data set and the second data set into the training data set. The computer-implemented method further including: identifying a panel specific to the user based on the incomplete subset, the panel being used for testing a likelihood that the user will develop one or more conditions. Implementations of the described techniques may include hardware, a method or process, or computer software on a computer-accessible medium.

One general aspect includes a system, including: one or more processors; and a non-transitory computer-readable storage medium containing instructions which, when executed on the one or more processors, cause the one or more processors to perform operations including: receiving, at a server, a first communication corresponding to a request to generate a value associated with a user, the value representing a degree to which a protocol is effective for positively modifying an expected result associated with a condition. The system also includes identifying a set of genes, each gene of the set of genes being associated with one or more conditions, and each condition of the one or more conditions having an expected result that is positively modifiable by performing a protocol. The system also includes accessing a user data set associated with the user, the user data set including one or more feature values that characterize the user. The system also includes inputting the user data set into a trained machine learning model, the trained machine learning model having been trained to generate an output predictive of whether performing a protocol for an individual user will or is likely to positively modify an expected result associated with a condition, the trained machine learning model having been trained using a training data set associated with a plurality of other users, and the trained machine learning model including one or more intermediate values determined using the training data set. The system also includes processing the user data set using the trained machine learning model, the processing including evaluating the one or more feature values of the user data set using the one or more intermediate values, the evaluation resulting in one or more weighted feature values being generated, and each weighted feature value of the one or more weighted feature values being associated with a gene of the set of genes. The system also includes in response to processing the user data set using the trained machine learning model, generating an output corresponding to the requested value associated with the user, the output being an aggregation of each of the one or more weighted feature values, the output representing a degree to which performing the protocol for the user is predicted to positively modify the expected result of a condition. The system also includes selecting an incomplete subset of the set of genes, the selection of each gene included in the incomplete subset being based at least in part on the output generated for the user by the trained machine learning model. The system also includes generating a second communication including the incomplete subset specific to the user. The system also includes transmitting the second communication responsive to receiving the first communication. Other embodiments of this aspect include corresponding computer systems, apparatus, and computer programs recorded on one or more computer storage devices, each configured to perform the actions of the methods.

Implementations may include one or more of the following features. The system where the operations further include: performing a clustering operation on the training data set, the performance of the clustering operation forming one or more clusters of users, each cluster of the one or more clusters representing one or more users of the plurality of other users that share a common feature. The system may also include calculating a similarity metric between the user and the one or more users of each cluster of the one or more clusters, the similarity metric being calculated by mapping the one or more features characterizing the user to each cluster of the one or more clusters. The system may also include selecting the incomplete subset based on at least a portion of the training data set that corresponds to a cluster associated with a highest similarity metric. The system where the similarity metric is calculated using one or more collaborative filtering techniques. The system where the trained machine learning model is a decision tree model, where processing the user data set using the decision tree model results in generating one or more feature nodes, each feature node of the one or more feature nodes being associated with an expected value learned during training. The system where the operations further include: accessing an additional user data set corresponding to an additional user. The system may also include inputting the additional user data set into the trained machine learning model. The system may also include processing the additional user data set using the trained machine learning model. The system may also include generating an additional output in response to processing the additional user data set using the trained machine learning model. The system may also include selecting an additional incomplete subset of the subset of genes, where the additional incomplete subset is selected based on the additional output generated by the trained machine learning model, and where the additional incomplete subset includes one or more genes that are different from the incomplete subset associated with the user. The system where the operations further include: generating the training data set by: retrieving a first data set representing one or more previously determined outcome variables associated with each of the plurality of other users, each previously determined outcome variable of the one or more previously determined outcome variables indicating an outcome of performing the protocol for a user of the plurality of other users; retrieving a second data set representing one or more previously determined measurement variables associated with each of the plurality of other users, each previously determined measurement variable of the one or more previously determined measurement variables indicating a measured data point associated with a user of the plurality of other users. The system may also include combining each of the first data set and the second data set into the training data set. The system where the operations further include: identifying a panel specific to the user based on the incomplete subset, the panel being used for testing a likelihood that the user will develop one or more conditions. Implementations of the described techniques may include hardware, a method or process, or computer software on a computer-accessible medium.

One general aspect includes a computer-program product tangibly embodied in a non-transitory machine-readable storage medium, including instructions configured to cause a processing apparatus to perform operations including: receiving, at a server, a first communication corresponding to a request to generate a value associated with a user, the value representing a degree to which a protocol is effective for positively modifying an expected result associated with a condition. The computer-program product also includes identifying a set of genes, each gene of the set of genes being associated with one or more conditions, and each condition of the one or more conditions having an expected result that is positively modifiable by performing a protocol. The computer-program product also includes accessing a user data set associated with the user, the user data set including one or more feature values that characterize the user. The computer-program product also includes inputting the user data set into a trained machine learning model, the trained machine learning model having been trained to generate an output predictive of whether performing a protocol for an individual user will or is likely to positively modify an expected result associated with a condition, the trained machine learning model having been trained using a training data set associated with a plurality of other users, and the trained machine learning model including one or more intermediate values determined using the training data set. The computer-program product also includes processing the user data set using the trained machine learning model, the processing including evaluating the one or more feature values of the user data set using the one or more intermediate values, the evaluation resulting in one or more weighted feature values being generated, and each weighted feature value of the one or more weighted feature values being associated with a gene of the set of genes. The computer-program product also includes in response to processing the user data set using the trained machine learning model, generating an output corresponding to the requested value associated with the user, the output being an aggregation of each of the one or more weighted feature values, the output representing a degree to which performing the protocol for the user is predicted to positively modify the expected result of a condition. The computer-program product also includes selecting an incomplete subset of the set of genes, the selection of each gene included in the incomplete subset being based at least in part on the output generated for the user by the trained machine learning model. The computer-program product also includes generating a second communication including the incomplete subset specific to the user. The computer-program product also includes transmitting the second communication responsive to receiving the first communication. Other embodiments of this aspect include corresponding computer systems, apparatus, and computer programs recorded on one or more computer storage devices, each configured to perform the actions of the methods.

Implementations may include one or more of the following features. The computer-program product where the operations further include: performing a clustering operation on the training data set, the performance of the clustering operation forming one or more clusters of users, each cluster of the one or more clusters representing one or more users of the plurality of other users that share a common feature. The computer-program product may also include calculating a similarity metric between the user and the one or more users of each cluster of the one or more clusters, the similarity metric being calculated by mapping the one or more features characterizing the user to each cluster of the one or more clusters. The computer-program product may also include selecting the incomplete subset based on at least a portion of the training data set that corresponds to a cluster associated with a highest similarity metric. The computer-program product where the similarity metric is calculated using one or more collaborative filtering techniques. The computer-program product where the trained machine learning model is a decision tree model, where processing the user data set using the decision tree model results in generating one or more feature nodes, each feature node of the one or more feature nodes being associated with an expected value learned during training. The computer-program product where the operations further include: accessing an additional user data set corresponding to an additional user. The computer-program product may also include inputting the additional user data set into the trained machine learning model. The computer-program product may also include processing the additional user data set using the trained machine learning model. The computer-program product may also include generating an additional output in response to processing the additional user data set using the trained machine learning model. The computer-program product may also include selecting an additional incomplete subset of the subset of genes, where the additional incomplete subset is selected based on the additional output generated by the trained machine learning model, and where the additional incomplete subset includes one or more genes that are different from the incomplete subset associated with the user. The computer-program product where the operations further include: generating the training data set by: retrieving a first data set representing one or more previously determined outcome variables associated with each of the plurality of other users, each previously determined outcome variable of the one or more previously determined outcome variables indicating an outcome of performing the protocol for a user of the plurality of other users; retrieving a second data set representing one or more previously determined measurement variables associated with each of the plurality of other users, each previously determined measurement variable of the one or more previously determined measurement variables indicating a measured data point associated with a user of the plurality of other users. The computer-program product may also include combining each of the first data set and the second data set into the training data set. Implementations of the described techniques may include hardware, a method or process, or computer software on a computer-accessible medium.

BRIEF DESCRIPTION OF THE DRAWINGS

FIGS. 5A and 5B illustrate example data tables representing condition dependencies, according to aspects of the present disclosure.

FIG. 6A is a table identifying example user specific and condition specific outcome data, according to aspects of the present disclosure.

FIG. 6B is a table showing an example binning model for user specific predictions, according to aspects of the present disclosure.

DETAILED DESCRIPTION

Figure 1:
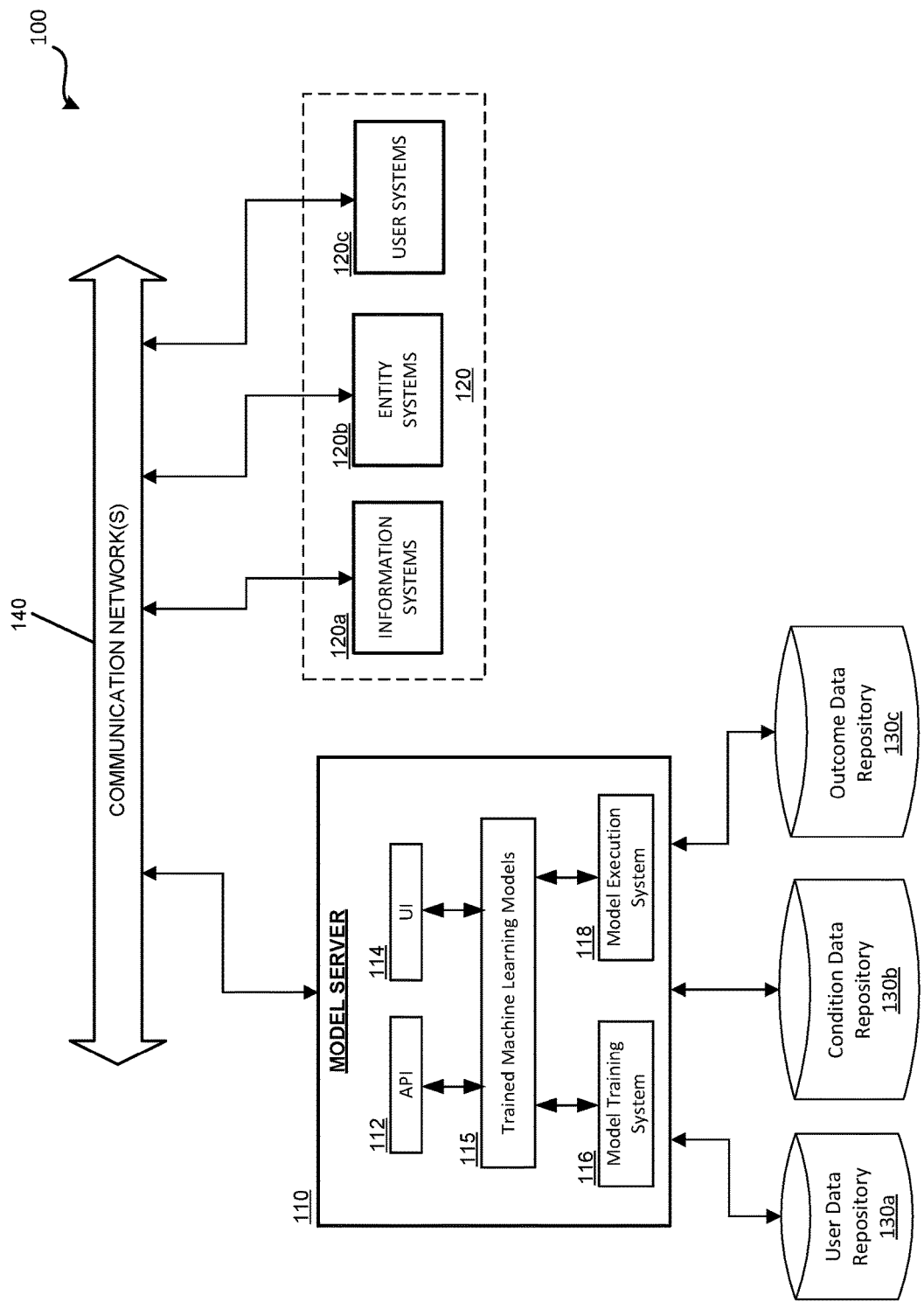
FIG. 1 shows an example computing environment including a model server and related subcomponents and client systems, in which various embodiments of the present disclosure may be implemented.

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs)

Sequencing a panel of a user's genes can be performed to detect a likelihood of the user having or developing a condition linked to the genes in the panel. Protocols can be any action (or lack of action) that can be performed (or not performed) to positively modify an expected result associated with the condition that is linked to the gene(s) that were sequenced. Non-limiting examples of actions that, if performed, can positively modify an expected result may include performing a test to detect a condition at an early stage before the occurrence of an adverse event expected to occur during the later stages of the condition, performing a movement routine (e.g., exercise) that reduces the likelihood of developing the condition, monitoring certain user features to reduce the likelihood of developing the condition, performing a set of corrective actions (e.g., surgery) that reduces the likelihood of developing the condition or that improves the quality of life for the user, and other suitable actions. An expected result may be an event (e.g., a diagnosis or an adverse event) expected to occur in association with users who have an increased likelihood of a condition. Protocols may be defined by guidelines issued by an entity, such as a health organization.

A set of users in which an attribute is present (e.g., a gene or gene mutation) may have previously performed (or previously been subject to the performance of) a protocol associated with a condition. Each user of the set of users may have or potentially have a condition linked to a gene. The purpose of performing the protocol on the user or by the user may be to potentially modify an expected result of the user's condition in a manner that results in a positive outcome. For each user of the set of users, a user outcome may have been determined after the protocol was performed. Non-limiting examples of user outcomes may include a target outcome indicating that the expected result was positively modified by the performance of the protocol, a negative outcome indicating that the expected result was not modified by the performance of the protocol or that the expected result was negatively modified by the performance of the protocol (e.g., a user undergoes preventative surgery, but surgical complications impacted the user in a negative manner, such as an overall reduced quality of life), uncertain or unknown outcomes, or potentially positive or potentially negative outcomes. In some implementations, the user outcomes may be a value within a scale of values to represent a magnitude of the positive, unknown, or potentially negative user outcome.

In some implementations, systems and methods described herein may be configured to collect data sets to use as training data for the machine learning models. The collected data sets can include at least a first data set characterizing user features of each user of the set of users and a second data set characterizing the user outcomes for each user of the set of users after performance of the protocol. In some implementations, systems and methods described herein may be configured to collect a third data set characterizing one or more conditions. For example, data characterizing a condition may include a known link between an attribute and the condition, characteristics of the condition (e.g., trajectory of events expected for users with the condition), associated conditions, known protocols for modifying expected results associated with the condition, and other suitable information.

In some implementations, the systems and methods described herein may include processing the collected data sets (e.g., training data set(s)) to train machine learning or artificial intelligence models. Training the machine learning or artificial intelligence models using the collected data sets may include executing the machine learning or artificial intelligence models to generate one or more intermediate values (e.g., feature weights). The generated intermediate values may, in some cases, be informative in selecting a user specific panel. The one or more intermediate values of the trained machine learning model can be used to predict outcomes for new users (e.g., users who are not included in the training data set described above). As a non-limiting example, if the collected data sets include labeled data, a segmentation system (e.g., configured to execute supervised learning techniques) may evaluate the collected data sets to train the machine learning or artificial intelligence models to segment or group the new users based on the labels of the labeled data. The segmentations or groups of the new users can be used to select a user specific panel for testing. For example, a new user may be a user who is not included in the training data set (e.g., not included in the set of users who previously performed the protocol, or a user for which the protocol has not yet been performed and a user outcome corresponding to a result of performing the protocol is unknown, and thus, can be predicted). A user data set may include user features (also referred to herein as feature values) that characterize the new user (described in greater detail below). The predictive outputs and any intermediate values (generated by the trained machine learning or artificial intelligence models) can, in some cases, be evaluated to predict whether or a degree to which a protocol is likely to positively modify an expected result of an existing or potential condition for a new user. If the output generated by the segmentation system indicates an expected positive user outcome for the new user (e.g., a positive user output being that performing a protocol is predicted to improve the user's quality of life), then the gene(s) associated with the existing or potential condition may be included in a panel for the new user. However, if the predicted user outcome for the new user is a negative or a potentially negative outcome (e.g., a negative outcome being that performing a protocol is not predicted to improve the user's quality of life, or that performing the protocol may result in reducing the user's quality of life), then the gene(s) associated with the condition can be excluded from the panel for the new user. In this manner, a user specific panel that is contextual to the user and for which protocols are likely to result in a positive outcome for the user (if the protocols are performed) may be selected based on the predictive output(s) of the trained machine learning or artificial intelligence model.

As another non-limiting example, in cases where the collected data sets may not include labeled data, a recommender system (e.g., executing unsupervised learning techniques, such as k-means clustering or nearest neighbor techniques) may evaluate the collected data sets to train the machine learning or artificial intelligence models to generate predictive outputs in response to processing user data sets characterizing new users. The recommender system may evaluate the collected data sets and a user data set characterizing a new user to identify one or more users (from the set of users in the training data set) who are similar to the new user (e.g., who share a common user feature value). In some examples, the recommender system may execute one or more collaborative filtering techniques to identify similar users from the set of users. The user outcomes associated with the similar users may be used to predict a user outcome for a protocol that has not yet been performed on or by the new user. If the predicted user outcome for the new user is a positive user outcome, then the gene(s) present in the users who are similar (i.e., the similar users from the set of users included in the training data set) can be included in a panel for the new user. However, if the predicted user outcome for the new user is a negative, unknown, or potentially negative outcome, then the gene(s) present in the users who are similar can be excluded from the panel for the new user.

Additional techniques are described herein for determining branching paths (in the case of decision tree models) and/or intermediate values during the execution of a trained machine learning model on user data sets. As a non-limiting example, when using a trained decision tree model to predict user outcomes for new users, the specific branching paths traversed and the intermediate values encountered on route to the predicted user outcome may be stored and analyzed. Executing a decision tree model results in the generation of the one or more feature nodes with expected values (e.g., an average value in a regression tree, or a probability in a classification tree) learned during training. In some cases, these branching points and intermediate values may correspond to particular data points representing user features, such as specific factors within the user data set, family medical history, and other suitable factors. Accordingly, the output of the trained machine learning model may be used to predict the user outcome of performing a protocol (e.g., whether the performance of the protocol would likely yield a positive, negative, or unknown outcome), as well as the branching paths and intermediate values by which the model arrived at the predicted user outcome (e.g., corresponding to a leaf node in a decision tree). The branching paths and/or intermediate values may be analyzed to determine which user features are the most predictive, for example, the most determinative for user outcomes. The computer system also may use the branching paths and/or intermediate values to execute alternative scenarios, such as scenarios in which one user feature of the user is modified or missing.

Performing protocols may or may not positively modify expected results of conditions (e.g., a positive modification may be an improvement to a user's quality of life or the early detection of the likelihood the user will develop a condition). The outcome of whether the performance of a protocol positively modifies the expected result may depend on the attributes or user features that characterize a user. As an example, for some users with a particular attribute, performing a protocol may reduce the progression of a condition associated with that particular attribute. However, for other users with that same particular attribute, performing the protocol may have no impact on the progression of or the prevention of an adverse event expected to occur in users with a likelihood (e.g., risk) for developing a condition associated with that particular attribute. As an advantage of certain embodiments described herein, trained machine learning or artificial intelligence models can be used to process user data sets characterizing users to generate predictive outputs (including values generated as intermediates before the final output). The outputs can be evaluated to predict which users would likely experience positive user outcomes after a protocol is performed, if an attribute was present in the user. For those users for which a positive user outcome is predicted, the attribute can be included in a panel for testing. For other users for which a negative, potentially negative, uncertain, or neutral user outcome is predicted, the attribute may be excluded from the panel because the protocol is not likely to positively modify any expected results of a condition associated with the attribute (if the user is determined to have increased likelihood of developing that condition).

Additionally, as a technical challenge, user data sets characterizing a new user (e.g., a user not included in the training data set) may not include sufficient data. This is referred to as the "thin data" problem. However, as a technical advantage of certain embodiments described herein, even for users with "thin data," the systems and methods described herein may nonetheless be used to predict whether or a degree to which a protocol would likely modify an expected result of a condition, if a user is determined to have an increased likelihood for developing that condition. For instance, the systems and methods may use machine learning or artificial intelligence techniques to cluster users and identify users who are similar to the user with "thin data" in his or her user data set.

Example Computing Environments and Systems for Using Trained Machine Learning or Artificial Intelligence Models to Predict User Outcomes Referring now to FIG. 1, an example is shown of a distributed computing environment 100 including a model server 110 that may be used for processing user data sets using machine learning or artificial intelligence models to generate outputs predictive of user outcomes of performing protocols. As shown in this example, a model server 110 may communicate with various client devices and systems 120 over one or more communication networks 140. In some implementations, client devices and systems 120 may interact with one or more application programming interfaces (APIs) 112 and/or user interface components 114 within the model server 110, to predict user outcomes for specific protocols. The model server 110, discussed in more detail below, may include various hardware and/or software systems and sub-components, including trained machine learning models 115 as well as model training systems 116 and model execution systems 118. Using these systems, as well as data stores storing one or more user data sets characterizing users (e.g., user data repositories 130a), data sets characterizing conditions (e.g., condition data repository 130b), and data sets characterizing previous outcomes after performing one or more protocols (e.g., outcome data repository 130c), the model server 110 may train one or more machine learning or artificial intelligence models.

Executing the one or more machine learning or artificial intelligence models may generate an output that can be evaluated to predict user outcomes for users who have not yet performed or been the subject of performing a protocol.

As shown in the example computing environment 100, client systems 120 may include client computing devices associated with information systems 120a, entity systems 120b, and user systems 120c. Each of these client systems 120 may provide data that may be used by the model server 110 as training data for machine learning or artificial intelligence models executed to generate outputs or intermediate outputs that are predictive of user outcomes of certain protocols. For example, information systems 120a may provide data characterizing non-user specific aspects of various conditions (e.g., based on research, such as events expected to occur for users with a condition, known links between attributes and conditions, and the like). Additionally, any of the client systems 120 may provide individual instances of previous user outcomes, which may be stored within an outcome data repository 130c and/or used by model training system 116 to train the machine learning models 115. For example, users accessing information systems 120a, users accessing entity systems 120b (e.g., a system accessible by a clinic), and/or users accessing user systems 120c may transmit feedback data representing, for example, an accuracy of the predictive model outputs or any other data characterizing one or more conditions. Such feedback data for previously performed protocols may include the specific attributes present in users who performed a protocol, the attributes that were tested for specific variants, user data including user characteristics, such as medical history, family medical history, and other suitable data. As discussed above, predicted user outcomes may refer to the extent to which some action may be performed to prevent an expected result (associated with a condition) from occurring or to modify an aspect of the expected result.

In addition to providing training data the user data repository 130a, the condition data repository 130b, and the outcome data repository 130c, each of the client systems 120 also may interact with the model server 110 to request that a predictive user outcome value be generated for a specific user based on execution of the trained machine learning models 115. For example, a research associated with information systems 120a may select one or more conditions displayed on an interface, and may provide a specific user data set characterizing a specific user to the model server 110, to request that the model server 110 generate a predictive user outcome for the specific user.

As discussed below in more detail, the model server 110 may generate, train, and execute machine learning models 115 configured to provide user specific predictions of user outcomes of protocols for conditions linked to one or more attributes. A model training system 116 may retrieve data from data stores 130 and/or client systems 120, in order to train models 115 to generate outputs or intermediate outputs predictive of user outcomes, which are calculated for specific users, attributes, and conditions. A model execution system 118 may access the trained machine learning models 115 and provide input data to the trained models 115 to determine user specific and condition-specific user outcomes. The outputs of the trained models 115 may be provided to client systems 120 via the API 112 and/or user interface components 114. Further, the outputs of the trained models 115 may include one or more intermediate values and a final output, such as the final value outputted by the trained models 115. The one or more intermediate values and the final output may be specific to a user, and thus, may be used to predict whether performing a protocol would likely be successful in positively modifying an expected result of a condition linked to an attribute (e.g., a user outcome value). In some examples, trained models 115 may include logistic regression models, in which case the intermediate values may be feature weights of the model(s). In some examples, trained models 115 may include decision trees, in which case the intermediate values may be one or more feature nodes with expected values (e.g., an average value in a regression tree, or a probability in a classification tree) learned during training. In some examples, trained models 115 may include neural networks, in which case the intermediate values may be a group of node activation functions. If the user outcome indicates a predicted positive outcome, then the attribute may be included in a user specific panel for testing. If the user outcome indicates a predicted negative outcome, then the attribute may be excluded from the user specific panel for testing. Advantageously, the model execution system 118 can generate outputs predictive of whether performing a protocol would make any positive difference for a condition that the user may (or may not) have.

In the embodiments discussed herein, client computing devices and systems 120 may include mobile devices (e.g., smartphones, computing tablets, personal digital assistants (PDAs), wearable devices, etc.) running a variety of mobile operating systems, and being Internet, e-mail, short message service (SMS), Blackberry®, or other communication protocol enabled. The client computing devices and systems 120 also may be general-purpose computers, such as personal computers and/or laptop computers running various operating systems. The client systems 120 also may be workstation computers running any of a variety of operating systems. Alternatively, or in addition, client systems 120 may be any other electronic device, such as a thin-client computer, an Internet-enabled gaming console system and/or personal messaging devices or other devices capable of communicating over network(s) 140. Although the illustrated computing environment 100 is shown with three client systems 120, it should be understood that any number of client computing devices may be supported. Other devices, such as sensor devices, etc., also may interact with the model server 110.

The communication network(s) 140 shown in computing environment 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 140 may be a local area network (LAN), such as one based on Ethernet, Token-Ring and/or the like. Network(s) 140 also may be or may include a wide-area network such as the Internet. Network 140 may include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

The model server 110 may be a server system including one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 110 may be adapted to run one or more services or software applications described herein. For example, server 110 may include web servers and/or application servers configured to perform processing and execute software components described herein to implements to various embodiments and aspects of the present disclosure.

The model server 110 may execute an operating system including any available server operating system. The model server 110 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Data repositories 130 may include databases or data store structures storing various user data 130a (e.g., user characteristics and demographic data, user medical history data, user family history data, user treatments and medication data), non-user specific condition data in condition data repository 130b, and non-user specific user outcome data stored in outcome data repository 130c to train the models 115. Data stores 130 may reside in a variety of locations. For example, one or more of the data stores 130 may reside on non-transitory storage media local to (and/or resident in) server 110. Alternatively, data stores 130 may be stored separately and externally from the model server 110, and may communicate with server 110 via a network-based or dedicated connection. In some embodiments, data stores 130 may reside in a storage-area network (SAN). Similarly, any necessary data or files for performing the functions of the model server 110 may be stored locally on the server 110 and/or remotely, as appropriate. In some embodiments, data stores 130 may include relational databases that are adapted to store, update, and retrieve data in response to formatted queries and commands.

Figure 2:
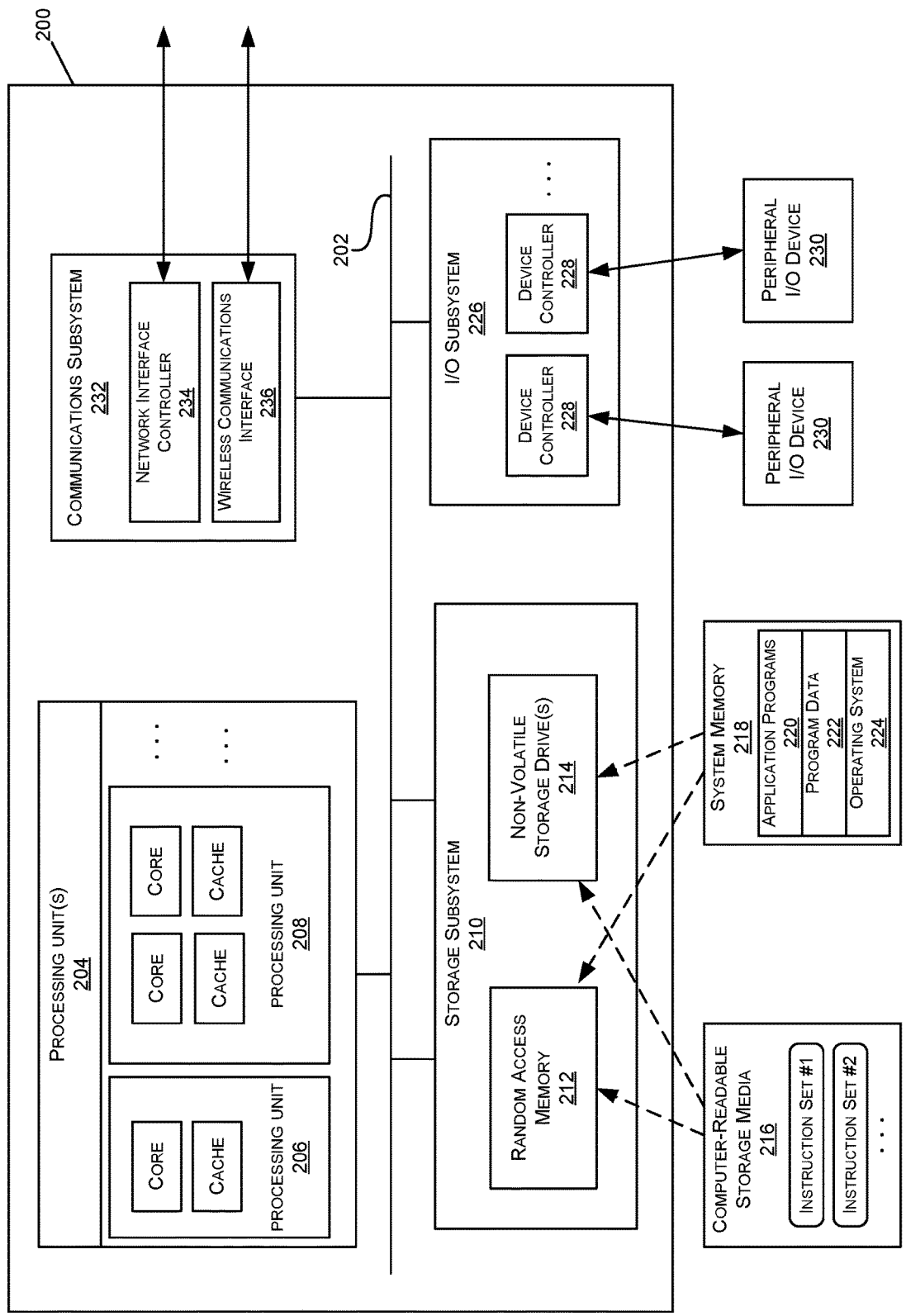
FIG. 2 is a block diagram of an example computing device according to embodiments of the present disclosure.

Referring now to FIG. 2, a block diagram of an illustrative computer system is shown. The system 200 may correspond to any of the computing devices or servers within the computing environment 100 described above, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Bus subsystem 202 provides a mechanism for letting the various components and subsystems of computer system 200 communicate with each other as intended. Although bus subsystem 202 is shown schematically as a single bus, alternative embodiments of the bus subsystem may utilize multiple buses. Bus subsystem 202 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 204, which may be implemented as one or more integrated circuits (e.g., a conventional microprocessor or microcontroller), may control the operation of computer system 200. One or more processors, including single core and/or multicore processors, may be included in processing unit 204. As shown in the figure, processing unit 204 may be implemented as one or more independent processing units 206 and/or 208 with single or multicore processors and processor caches included in each processing unit. In other embodiments, processing unit 204 may also be implemented as a quad-core processing unit or larger multicore designs (e.g., hexa-core processors, octo-core processors, ten-core processors, or greater. As discussed above, in some cases, processing unit 204 may include one or more specialized ASICs designed and configured for cryptocurrency mining and/or specialized cryptographic hardware for handling cryptocurrency transactions.

Processing unit 204 may execute a variety of software processes embodied in program code, and may maintain multiple concurrently executing programs or processes. At any given time, some or all of the program code to be executed can be resident in processor(s) 204 and/or in storage subsystem 210. In some embodiments, computer system 200 may include one or more specialized processors, such as digital signal processors (DSPs), outboard processors, graphics processors, application-specific processors, and/or the like.

I/O subsystem 226 may include device controllers 228 for one or more user interface input devices and/or user interface output devices 230. User interface input and output devices 230 may be integral with the computer system 200 (e.g., integrated audio/video systems, and/or touchscreen displays), or may be separate peripheral devices which are attachable/detachable from the computer system 200.

Input devices 230 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 230 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 230 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 230 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 200 to a user or other computer. For example, output devices 230 may include, without limitation, a variety of display devices that visually convey text, graphics and audio/video information such as monitors, printers, speakers, headphones, automotive navigation systems, plotters, voice output devices, and modems.

Computer system 200 may comprise one or more storage subsystems 210, comprising hardware and software components used for storing data and program instructions, such as system memory 218 and computer-readable storage media 216. The system memory 218 and/or computer-readable storage media 216 may store program instructions that are loadable and executable on processing units 204, as well as data generated during the execution of these programs.

Depending on the configuration and type of computer system 200, system memory 218 may be stored in volatile memory (such as random access memory (RAM) 212) and/or in non-volatile storage drives 214 (such as read-only memory (ROM), flash memory, etc.). The RAM 212 may contain data and/or program modules that are immediately accessible to and/or presently being operated and executed by processing units 204. In some implementations, system memory 218 may include multiple different types of memory, such as static random access memory (SRAM) or dynamic random access memory (DRAM). In some implementations, a basic input/output system (BIOS), containing the basic routines that help to transfer information between elements within computer system 200, such as during startup, may typically be stored in the non-volatile storage drives 214. By way of example, and not limitation, system memory 218 may include application programs 220, such as client applications, Web browsers, mid-tier applications, server applications, etc., program data 222, and an operating system 224.

Storage subsystem 210 also may provide one or more tangible computer-readable storage media 216 for storing the basic programming and data constructs that provide the functionality of some embodiments. Software (programs, code modules, instructions) that when executed by a processor provide the functionality described herein may be stored in storage subsystem 210. These software modules or instructions may be executed by processing units 204. Storage subsystem 210 may also provide a repository for storing data used in accordance with the present invention.

Storage subsystem 210 may also include a computer-readable storage media reader that can further be connected to computer-readable storage media 216. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, FireWire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources. Additionally, communications subsystem 232 may be configured to receive data in the form of continuous data streams, which may include event streams of real-time events and/or event updates (e.g., sensor data applications, financial tickers, network performance measuring tools, clickstream analysis tools, etc.). Communications subsystem 232 may output such structured and/or unstructured data feeds, event streams, event updates, and the like to one or more data stores that may be in communication with one or more streaming data source computers coupled to computer system 200.

Due to the ever-changing nature of computers and networks, the description of computer system 200 depicted in the figure is intended only as a non-limiting example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
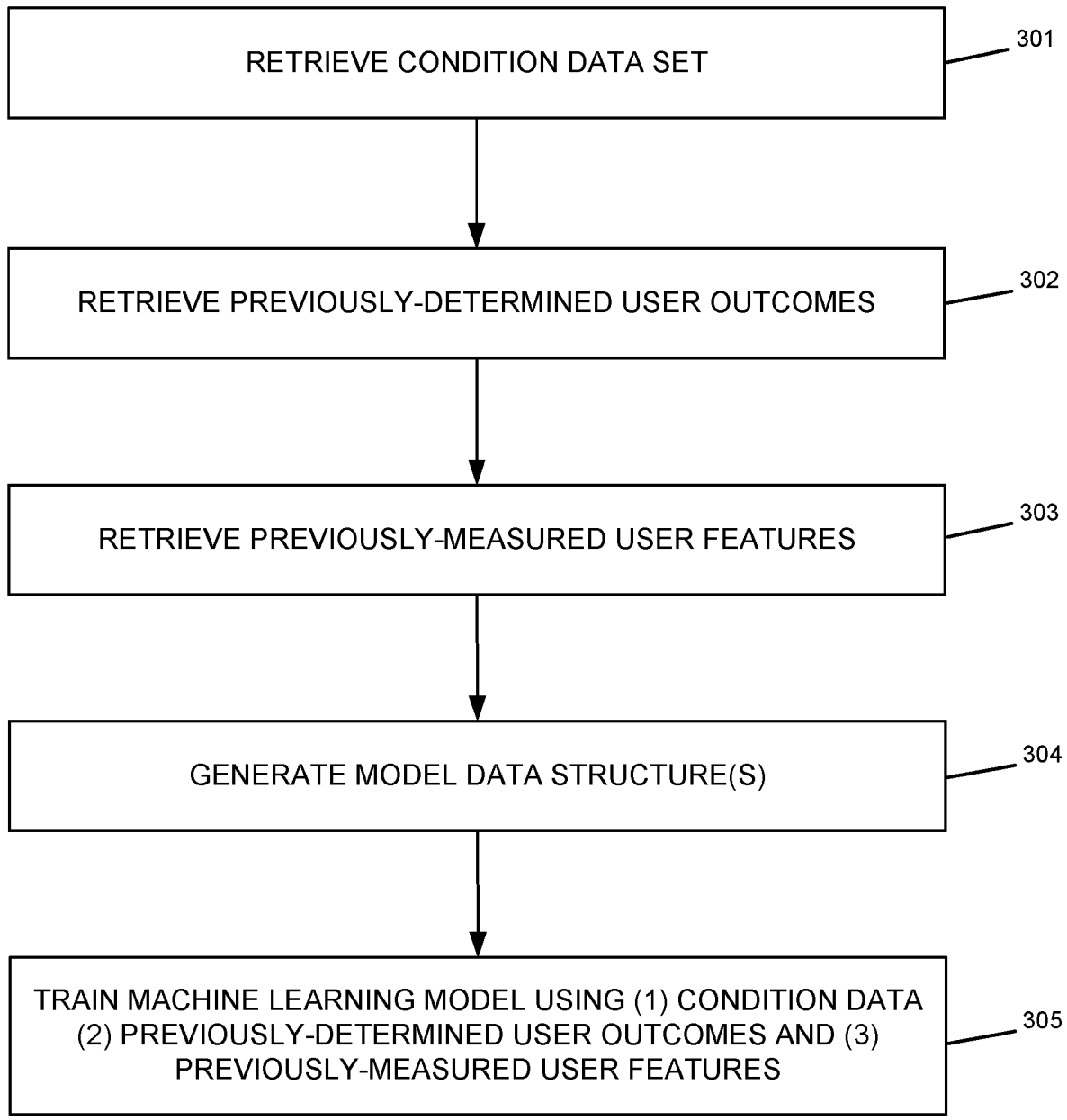
FIG. 3 is a flowchart illustrating a process of training a machine learning model to determine user specific outputs predictive of a degree to which performing protocols can positively modify an expected result associated with a condition, according to aspects of the present disclosure.

Training Machine Learning Models for Generating Intermediate Outputs and Final Outputs Predictive of User Outcomes Referring now to FIG. 3, a flowchart is shown illustrating a process of training a machine learning model to generate intermediate and final outputs, each of which can be evaluated to predict whether or a degree to which performing a protocol may modify an expected result associated with a potential condition of a user. As described below, the processes of receiving and storing training data, and generating and training model structures may be performed by the various devices operating within the computing environment 100, including the model training system 116 of the model server 110. However, it should be understood that the techniques described in reference to FIG. 3 need not be tied to any particular devices or servers within the computing environment 100, but may be implemented by any computing systems and devices described or supported herein.

In step 301, the model training system 316 and/or other systems within the model server 110 may receive condition data, for example, from condition data repository 130b. For example, the condition data may include one or more data sets characterizing a condition (or multiple conditions). Examples of condition data characterizing a condition may include data representing certain expected results or events known to occur in users with the condition, known links to attributes (e.g., gene mutations) present in users with the condition, associated conditions, medical data of users with the condition, protocols that have been known to result in positive or negative outcomes for users with the condition, and other suitable information. In some implementations, the condition data may not identify any specific users, but rather may include de-identified and aggregated data characterizing a condition experienced by a plurality of users. Further, the condition data may refer to "baseline" prior probabilities of user outcomes after users in which an attribute is present performed a protocol. The prior probabilities may not assume any information regarding the user's health history or other input features. Thus, the condition data received in step 301 may not be specific to any user, such as data from research studies linking specific attributes to certain conditions. The condition data received in step 301 may be received from any of the client systems 120 of the data repositories 130.

Additionally, the conditions characterized by the condition data received at step 301 may include any health-related conditions or disease linked or not linked to an attribute. For instance, specific attributes may be associated with physical, mental, or emotional characteristics. Thus, the condition data received in step 301 may include non-user specific data correlating particular user characteristics with particular attributes.

In step 302, the model training system 116 may receive previously determined user outcomes. For example, a set of users in which an attribute is present may have previously performed (or previously been a subject of the performance of) a protocol. Each user of the set of users may have an existing or potential condition. The purpose of performing the protocol on the user or by the user may be to potentially positively modify an expected result of the user's existing or potential condition. For each user of the set of users, a user outcome may have been determined after the protocol was performed. Non-limiting examples of user outcomes may include a positive outcome indicating that the expected result was modified by the performance of the protocol or a negative outcome indicating that the expected result was not modified by the performance of the protocol. The previously determined user outcomes may be included in the data set received at block 302.

In some implementations, the previously determined user outcomes may be a value within a scale of values to represent a magnitude of the positive or negative outcome. The data set received at block 302 may be grouped (or binned) based on various factors relating to the condition. For instance, a portion of the data set (received at step 302) that represents positive user outcomes may be grouped or binned together. Another portion of the data set (received at step 302) that represents unknown or potentially negative user outcomes may be grouped or binned. Yet another portion of the data set (received at step 302) that represents no valuable information may be grouped or binned.

In step 303, the model training system 316 may retrieve the previously measured user features (e.g., user data sets that characterize a user) for each user of the set of users represented by the data set received at step 302. The previously measured user features may be retrieved, for example, from a user data repository 130a or other data stores. Non-limiting examples of the previously measured user features may include any potentially relevant user data of the user, such as the user's demographic, physical or physiological characteristics (e.g., age, gender, height, weight, BMI, blood pressure and other vital statistics, etc.), the user's behaviors and habits (e.g., exercise, smoking, alcohol consumption, etc.) any data within the user's personal medical history or family medical history, any previous diagnoses or treatments of the user, any current or previous medications taken by the user, and so on.

In step 304, the model training system 316 (or other components with the server 110) may generate the one or more model data structures, and in step 305 the models may be trained using machine learning algorithms based on training data sets including any, some, or all of the data sets received in steps 301-303. As discussed below in more detail, several different types of trained models may be used in various embodiments, including segmentation systems that execute supervised, semi-supervised, or unsupervised learning techniques, such as a Naïve Bayes model, a Decision Tree or Tree Ensemble model, a Logistic Regression model, a Deep Learning Model (e.g., Recurrent Neural Network (RNN), and the like, or recommender systems that execute unsupervised learning techniques, such as collaborative filtering. Each of these models or types of modes may be discussed in more detail below. However, for each model or model type, the appropriate data structures may be generated in step 304, and in step 305 the models may be trained using the corresponding machine learning algorithms based on the training data received in steps 301-303.

At step 305, the models may be trained using machine learning or artificial intelligence algorithms that process the collected data sets to generate intermediate or final outputs that can be evaluated to predict user outcomes for users who have not performed or been the subject of the performance of a protocol. The condition data set received in step 301 may be used as input to the machine learning or artificial intelligence models to generate outputs (intermediate or final) indicating a detection of known links or dependencies between one or more attributes and a condition. The data set representing the previously determined user outcomes received at step 302 and the data set representing the previously measured user features received at step 303 may also be inputted into the model(s) generated at step 304. In some implementations, the accuracy of the model's generated predictions or the performance of the model can be determined by inputting the data set characterizing the previously measured user features (received in step 303) and generating outputs for each user in the set of user. The outputs can be used to predict the user outcomes for each user of the set of users. The predicted user outcomes can then be compared against the data set representing the actual previously determined user outcomes (received at step 302). The model may be adjusted based on the accuracy of the outputted predictions until an accuracy threshold has been reached by the model for the entire training data set.

Figure 4:
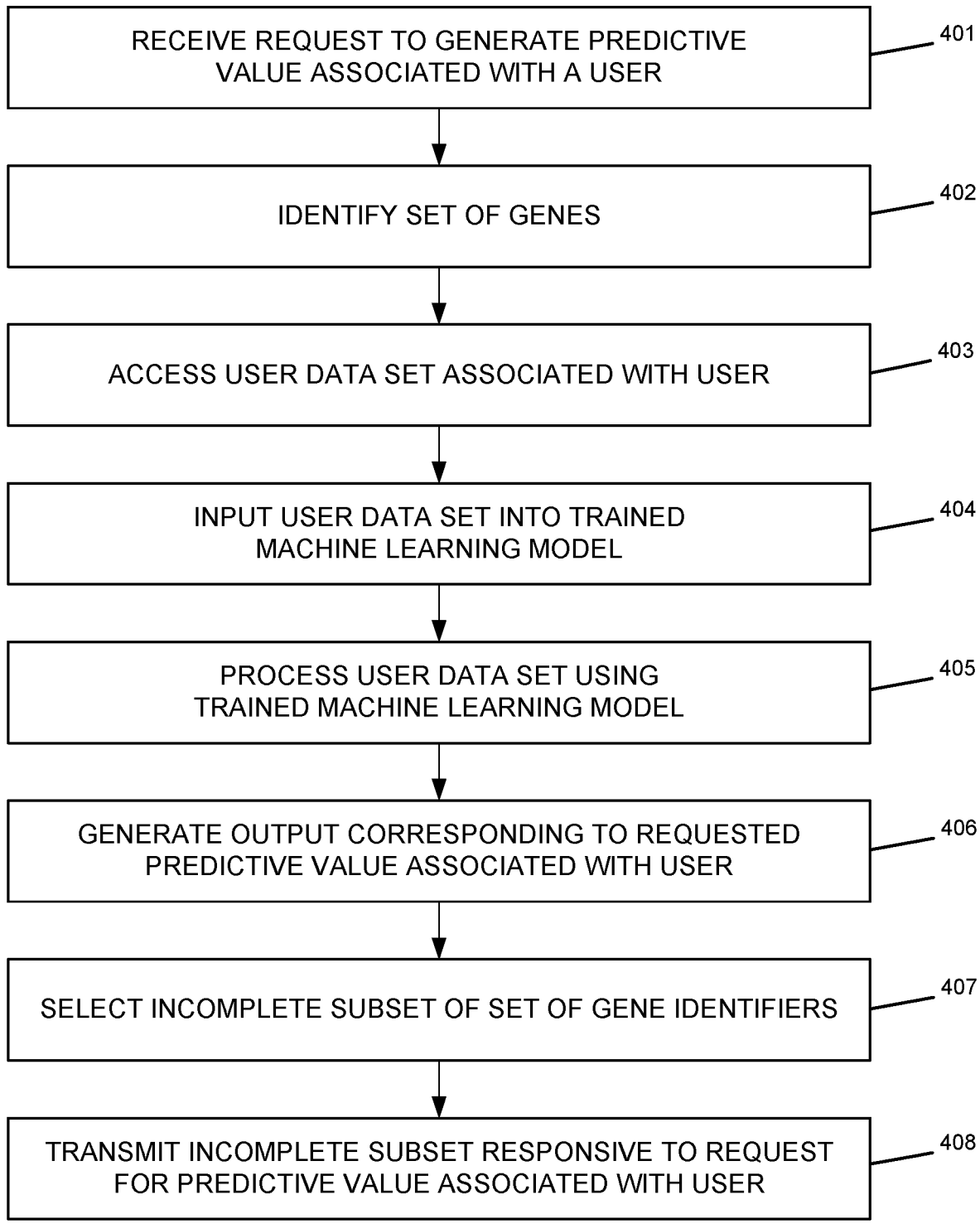
FIG. 4 is a flowchart illustrating a process of executing a machine learning model to determine user specific outputs predictive of a degree to which performing protocols can positively modify a result associated with a condition, according to aspects of the present disclosure.

Executing Machine Learning Models to Generate Intermediate Values Predictive of User Outcomes Referring now to FIG. 4, a flowchart is shown illustrating a process of executing a machine learning model to generate intermediate values that can be evaluated to predict user outcomes of performing protocols. For example, the techniques described below may include accessing and providing input to one or more trained machine learning models to generate intermediate values for a particular user, condition, attribute, or combination thereof. The features and steps described below, including receiving input data, accessing and using trained models, generating outputs predictive of user outcomes, and selecting incomplete subsets of attributes from a set of attributes, and the like, may be performed by the various devices operating within the computing environment 100, including the model execution system 118 of the model server 110. However, it should be understood that the techniques described in reference to FIG. 4 need not be tied to any particular devices or servers within the computing environment 100, but may be implemented by any computing systems and devices described or supported herein.

In step 401, the model server 110 may receive a communication from a user device. The user device may be operated by a user or by an individual on behalf of the user (e.g., a doctor for a patient). The communication may correspond to a request to generate a value associated with the user. For example, the value may represent whether or a degree to which a protocol is relevant or likely to be effective for positively modifying an expected result associated with a condition. The relevance or likelihood of effectiveness of a protocol that can positively modify an expected result associated with a condition indicates that performing the protocol on the user can result in a positive outcome associated with the condition. A non-limiting example of a protocol that is relevant to a user may include a particular surgery that is predicted to reduce the likelihood of the user developing a condition or reduce the chances of an existing condition progressing to the next stage.

Figure 10:
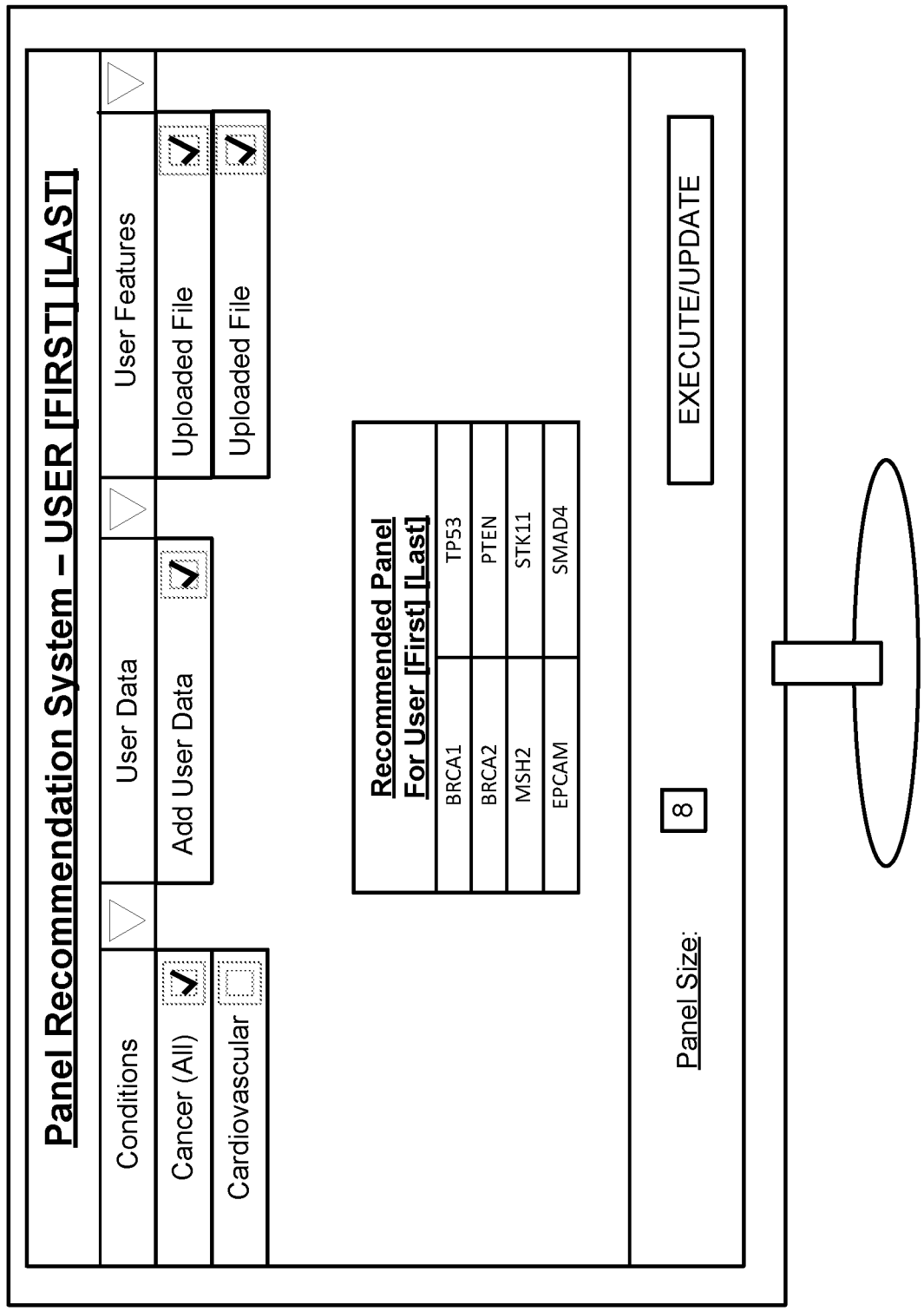
FIG. 10 is an example screen of a user interface configured to display user specific predictions, according to aspects of the present disclosure.

In some embodiments, the model server 110 may include one or more application programming interfaces (APIs) configured to support communications with various client systems, including authentication and security components to validate and authorize the client devices and/or users, so that the appropriate functionality of the model server 110 is provided only to authorized users. Additionally, in some embodiments, the model server 110 may provide one or more user interfaces 114 to allow users to request that a predictive value be generated in step 401. An example screen of a user interface configured to enable users to request predictive user outcomes, is shown in FIG. 10. As shown in this example, users may be able to upload user data sets as files and/or manually input user features, which may be transmitted to the model server 110.

In step 402, the model server 110 may identify a set of genes. Each gene of the set of genes may represent a gene or gene mutation and may correspond to a protocol. A gene that does not correspond to any protocols may be excluded from the set of genes. As a non-limiting example, the set of genes may represent a standard panel used for testing users for the existence of genetic mutations. However, the set of genes of the standard panel may not be informative for all users. For example, as described above, performing protocols may or may not modify expected results of conditions. The outcome of whether the performance of a protocol modifies the expected result may depend on the attributes present in a user or the user features that characterize the user. As an example, for some users with a particular attribute (e.g., gene mutation), performing a protocol may reduce the progression of a condition associated with that particular attribute. However, for other users with that same particular attribute, performing the same protocol may have no impact on the progression of the condition associated with that particular attribute. As an advantage of certain embodiments described in greater detail below, trained machine learning or artificial intelligence models can be used to process user data sets characterizing users to generate outputs (including values generated as intermediates before the final output) that can be used to select an incomplete subset of genes from the set of genes, such that the selected genes are associated with protocols that are predicted to have positive user outcomes for the user.

In step 403, the model server 110 may retrieve a user data set characterizing the user. For example, the user data set may be retrieved from user data repository 130*a*. As described above, a user data set may represent one or more user features that characterize the user. In step 404, the user data set may be inputted into the trained machine learning or artificial intelligence model. As described with respect to FIG. 3, the trained machine learning or artificial intelligence model may have been trained to generate an output predictive of whether or a degree to which the expected result associated with an individual user is modifiable by performing the protocol. For example, the machine learning or artificial intelligence model may have been trained using a training data set that includes a previously determined outcome variable (e.g., a variable from the data set characterizing previously determined user outcomes) and a previously measured variable (e.g., a variable from the data set characterizing the previously measured user features associated with each of a plurality of other users). Further, the trained machine learning model may be trained to detect at least one dependency between a previously determined user outcome and a previously measured user feature of the training data set.

In step 405, the user data set may be processed by the trained machine learning model. Processing the user data set using the trained machine learning model may include evaluating the one or more user features of the user data set based on the at least one detected dependency. For example, evaluating the one or more user features based on a detected dependency may include detecting that one of the user's previously measured user features (e.g., a previous determination of an arrhythmia) is shared in common between the user and one or more users of the set of users on which the machine learning model was trained. The dependency that was detected during the training of the model may be that the one or more users who exhibited the user feature may have previously tested positive for the presence of a particular attribute.

In step 406, one or more outputs may be generated by the trained machine learning model in response to processing the user data set. The one or more outputs may include one or more intermediate values (e.g., a decision tree traversal and associated probabilities learned during training at each feature node). As a non-limiting example, when the trained machine learning model is a linear model (e.g., a logistic regression model), the intermediate value may represent the probabilistic contribution of a user feature, such as the previous determination of an arrhythmia, to the final output, which can be used to predict a user outcome for a user. In this example, the trained machine learning model may have calculated a feature weight representing an arrhythmia. Certain user feature values of the user relating to an arrhythmia (which are included in the user data set) may be multiplied by the feature weight(s) representing arrhythmia to generate a weighted feature value associated with an arrhythmia and representing the contribution of the arrhythmia feature to the final output. In this example, if the trained machine learning model detected a pattern between a particular user feature from the training data set and a previously determined user outcome, then the feature weight representing the user feature may be a high value (e.g., 0.8). Thus, if the user data set for the user includes a user feature that matches the particular user feature, then a value representing the user feature for the user (e.g., 1 indicating the presence of an arrhythmia in the user) may be multiplied against the feature weight (e.g., 0.8) to generate a prediction of the user outcome for the user. Thus, if the previously determined user outcome that correlated to the presence of the particular user feature were a positive user outcome, then the user would be predicted to also have a positive user outcome. However, if the previously determined user outcome did not correlate to the presence of the particular user feature or the correlation was to an unknown or potentially negative user outcome (e.g., reduced quality of life), then the user would be predicted to have an unknown or negative user outcome. Accordingly, the output generated after processing the user data set using the machine learning model may represent whether or a degree to which performing the protocol is predicted to modify the expected result associated with the user. As described in the non-limiting example above, the output may be determined based at least in part on the one or more intermediate values. In the example of logistic regression models, the intermediate value(s) may be generated by multiplying the feature weight by the user feature value during processing of the user data set using the trained machine learning model. As another non-limiting example, the trained machine learning model may be a decision tree model. In this case, during training, the decision tree model results in the generation of one or more feature nodes with expected values, such as an average value in a regression tree, or a probability in a classification tree.

In step 407, an incomplete subset of the set of genes may be selected specifically for the user. The selection of each gene included in the incomplete subset may be based at least in part on the output generated for the user. For example, if the output generated by the machine learning model (or one of the intermediate outputs as described above) indicate a positive user outcome for a gene (e.g., an attribute potentially present in a user), then that gene may be included in the incomplete subset. Advantageously, the incomplete subset that is selected at step 407 is specific to the user based at least in part of the processing of the user data set by the machine learning model. Thus, for a particular attribute, two different users may have two different outputs generated by the trained machine learning model. For one user, the output may indicate that the testing for the presence of the attribute in the user is predicted as a positive user outcome, whereas, for the other user, the output may indicate that the testing for the presence of the same attribute is predicted as an unknown or potentially negative user outcome. The different in outputs may be based at least in part on the particular user features included in the user data sets characterizing the users.

In step 408, the incomplete subset may be transmitted to the user who generated the communication in step 401. Further, as an example, FIG. 10 illustrates an example interface that displays the incomplete subset of gene.

Referring briefly to FIGS. 5A and 5B, two data tables are shown including examples of condition data that may be stored in condition data repository 130b. In these examples, the leftmost column includes a listing of attributes. A gene or gene mutation may be an example of an attribute as used herein. The remaining columns contain binary (e.g., Yes/No) indications of whether or not the attribute in that row is known to be associated with a positive user outcome with respect to the condition of that column. For instance, referring to FIG. 5A, if a user selected Condition E (e.g., melanoma) using the interface shown in FIG. 10, for example, then the model server may retrieve the condition data characterizing Condition E (from condition data repository 103b), which would indicate that the attributes BRCA2, MITF, BAP1, CDKN2A, CDK4, TP53, and PTEN are generally associated or known to be associated with positive user outcomes for users who have Condition E. As another example, referring to FIG. 5B, if a user selected Condition Z (e.g., familial hypercholesterolemia) on the interface shown in FIG. 10, then the model server may retrieve the condition data characterizing Condition Z from the condition data repository 130b, which would indicate that when attributes APOB, LDLR, and PC5K9 are present in users, the users are known to experience positive user outcomes after a certain protocol is performed. Additionally, although these examples show binary previously determined user outcomes (i.e., Yes or No), in other examples the condition data may correspond to various types of scores (e.g., 1-10, 1-100, etc.), outcome categories, or bins based on user outcome, and the like. For example, user outcomes or condition association data may be represented by binary values (e.g., yes or no), categorical values (e.g., low, med, high), rating or degree values (e.g., a rating of outcome positivity or a degree of condition association), numerical values (e.g., a scale between one and five), float values (e.g., averaged scores with decimal points), or any other suitable type of values. Thus, the present disclosure is not limited to binary outcome variables, as illustrated in FIGS. 5A-5B and 6A.

A software-based model execution system 118 executing within the server 110 may be configured to access the appropriate trained model(s), and execute the trained models by providing the required input data and receiving/storing the outputs from the trained model. In some embodiments, the trained models 115 may include a different trained model for each attribute. In such embodiments, the model execution system 118 may access/execute the trained models for each specific attribute, providing inputs to the models that include the selected conditions, as well as the user data set received in step 403. In other embodiments, the trained models 115 may include a different trained model for each condition characterized in the condition data, in which case the model execution system 118 may access/execute the models 115 for each of the conditions, providing inputs to the models the user data set received in step 403 as well as the condition data stored in the condition data repository 130b. In still other embodiments, the trained models 115 may include a different trained model for each combination or permutation of attribute and a condition, in which case only the user data set received in step 403 might be provided as input to the model. In still further embodiments, the model server 110 may provide only a single model 115, where the execution system 118 provides all of the input data (e.g., received in steps 301-303, including the specific user data set, condition selections, and condition data (e.g., prior probability data), to the single model 115.

As discussed above, models 115 may be generated and trained using various machine learning techniques, so that the trained models generate intermediate and/or final outputs predictive of user outcomes. Each of the models 115 may be configured to output an "optimal" predicted user outcome, once that model has been trained during the training process with one or more sets of training data. The optimal output for a trained model 115 may refer to the output that most accurately comports with the training data (and the dependencies detected therein), and thus may be assumed to output the most accurate prediction when new input data is provided in step 405.

As noted above, the output from the executing the trained machine learning model(s) in step 406 may correspond to user specific prediction of a user outcome for a particular attribute, condition, user feature, or any combination thereof. In some embodiments, the trained models 115 may output binary values representing the predicted user outcome (e.g., Yes/No). For example, referring briefly to FIG. 6A, an example table is shown including previously determined user outcomes for a set of users. As shown in FIG. 6A, user data has been provided as input to the trained model(s) 115 for three different users (User1, User2, and User3), and based on the differences in these users' data (e.g., differences the user features that characterize the users), the output from the trained models 115 may be different for each of the three users with respect to user outcome of three attributes (BRCA1, BRCA2, and MUTYH) with respect to Condition 123 (e.g., cancer). It will be appreciated that the predicted user outcomes are not limited to binary variables, such as "yes" or "no." Any suitable variable may be used to represent the user outcome, such as categorical values (e.g., low, med, high), rating or degree values (e.g., a rating of outcome positivity or a degree of condition association), numerical values (e.g., a scale between one and five), float values (e.g., averaged scores with decimal points), or any other suitable type of value.

Additionally, an example binning model for predictive user outcomes is shown in FIG. 6B. In this example, user outcomes (either previously determined or predicted for a new user) may be "binned," or segmented into one of the different bins (or categories) shown, based on the user outcome. Using the binning model shown in FIG. 6B, the attributes segmented into Bin 1 correspond generally to positive user outcomes; the attributes segmented into Bins 2A-2D correspond to ineffective outcomes (e.g., no effective treatment available), uncertain outcomes (e.g., lack of published evidence or unknown penetrance), or outcomes that are not likely to prevent or modify an expected result associated with the user's potential or existing condition; and the attributes segmented into Bin 3 correspond to those attributes corresponding to unknown or potentially negative user outcomes.

Machine Learning Models and Other Model Types

As discussed above, various different types and technologies of artificial intelligence (AI)-based and machine learning models may be trained (as described in FIG. 3) and then executed (as described in FIG. 4) to generate one or more outputs predictive of user outcomes for performing a protocol. The predicted user outcomes can be evaluated to select an incomplete subset of gene from a set of genes. The incomplete subset that is selected corresponds specification to a particular user, and thus, genes for which a positive user outcome is predicted for the user may be included in the subset. The incomplete subset may ultimately be used as a panel for testing the presence of genes in the user. Several different examples of machine learning model types that may be used in various embodiments are discussed in the sections below.

Naïve Bayes Models

In certain embodiments, some or all of the trained machine learning models 115 may correspond to Naïve Bayes models. Trained Naïve Bayes models 115 may be used to predict user outcomes for a given user, using segmentation techniques based on Bayes' Theorem. A Naïve Bayes model may implement a simplifying assumption of impendence between all of the input data (or input features). Thus, such a model may assume that the various different user features may be independent of one another. This simplifying assumption may allow trained Naïve Bayes models to handle large user feature spaces. Naïve Bayes models also may be high-bias models, which are less prone to overfitting as a result. An example equation used to implement a Naïve Bayes model is shown below.

Likelihood      Class Prior Probability $$P(c|x) = \frac{P(x|c)P(c)}{P(x)}$$

Posterior Probability      Predictor Prior Probability $$P(c|X) = P(x_1|c) \times P(x_2|c) \times \ldots \times P(x_n|c) \times P(c)$$

In this example, the bottom equation is the Naïve Bayes algorithm. The input value "c" may correspond to an attribute of group of attributes, and the input value "x" may correspond to the various input features (e.g., the one or more user features included in the user data set). In some examples, the input features ("x") to a trained Naïve Bayes model 115 may include one or more of the user features discussed above, as well as the condition data that is not specific to a user (which also may be referred to as prior probability data). The outputs from a trained Naïve Bayes model 115 may include user specific predictions of user outcomes which may be binary (e.g., positive outcome predicted or negative outcome predicted), and/or non-binary such as multi-class predictions (e.g., various bins of attributes).

In some embodiments, during the training process, a Naïve Bayes model 115 may learn based on the inputted condition data (or baseline prior probability data), that is, the condition data assuming that no information is known about the specific user who is the subject of the prediction. Additionally, as noted above, a Naïve Bayes model 115 may assume that the input user features specific to the user may be independent from one another. In some cases, this assumption might not be accurate, and thus in such cases the exact output probabilities for user outcomes received from a Naïve Bayes model 115 might not be reliable. However, in these examples, the output probabilities still may be compared relative to one another to determine predict user outcomes.

Decision Tree Models

In some embodiments, the trained machine learning models 115 may include one or more decision tree models. During the training of a decision tree model 115, the model training system 116 may the iterate through the input features within the training data to determine the optimal splitting features as well as the optimal splitting thresholds/segmentations that most strongly differentiate the predicted user outcomes. As a result of the training process, input feature splits may be ordered based on the importance of the input feature on the predicted user outcome from the model. In some cases, the model training system 116 may implement a stopping criteria that may prevent any additional splitting/branching beyond the criteria, to avoid the resulting decision trees 115 being prone to overfitting.

Figure 7:
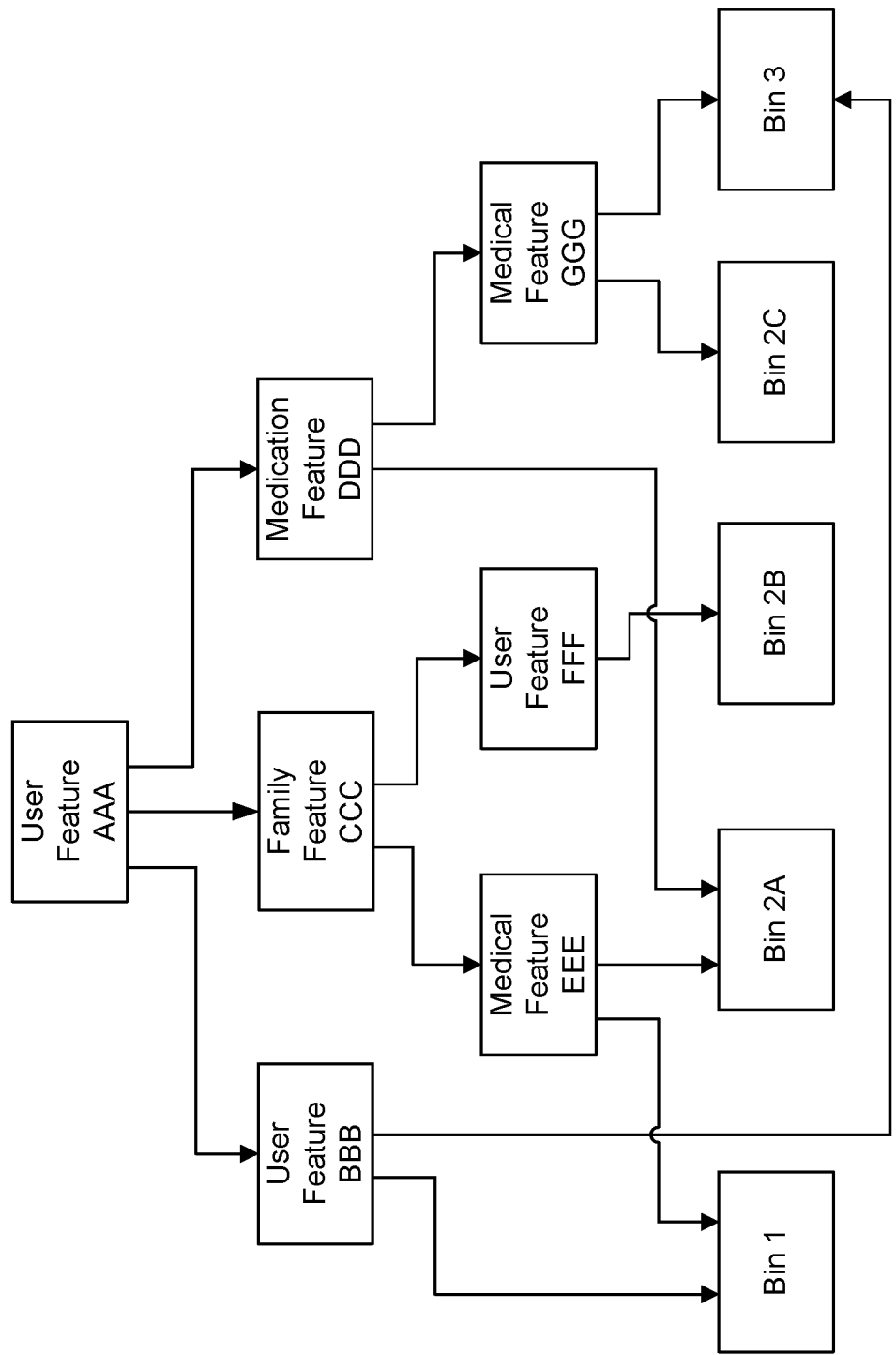
FIG. 7 shows an example of a trained decision tree data structure used to determine user specific intermediate values, according to aspects of the present disclosure.

Referring to FIG. 7, an example of a trained decision tree model is shown. The trained decision tree model may receive input features. For example, the input features may be user features of a user data set that characterizes a user. The user data set may be retrieved from user data repository 130a. The input features may be processed by the decision tree model. Processing the input features by the decision tree model may include iterating through the input features to determine the optimal splitting feature and splitting threshold that differentiates the outcome. For example, the decision tree model can be used to automatically determine that User Feature AAA can be split into three related user features: User Feature BBB, family feature CCC, and medication feature DDD. The splitting of the decision tree may be determined by executing one or more decision tree algorithms, such as random forest or gradient boosting techniques. Further, the splitting of the decision tree may indicate that User Feature BBB, family feature CCC, and medication feature DDD each contribute to differentiating the various outcome features (e.g., the leaf nodes of the decision tree).

The outcome in this example may correspond to one or more predicted user outcomes. The input features that are split may be ordered by importance to or influence on the user outcome. The one or more outputs of the decision tree model may be assigned or stored at the leaf nodes of the decision tree. The one or more outputs can be evaluated to predict a user outcome associated with a condition. In this example, multiple predicted user outcomes may be grouped or binned using information extracted from the condition data. For example, the condition data may be used to indicate that user outcomes can be binned into bin 1, bin 2a, bin 2B, bin 2C, and bin 3. As FIG. 7 illustrates, a decision tree model and algorithm may parallel human decision-making. However, the splitting criteria determined during the machine learning training processes may be used to automatically generate new classification rules and/or cut-offs, including those that are much more complex than any processing or decision making that could be performed by a human. Additionally, the rules within a decision tree model and algorithm may be applied to different conditions or attributes with similar functional impact.

For certain decision tree models, an ensemble of multiple decision trees may be used rather than a single tree. A tree ensemble (e.g., bagging, random forest, gradient boasting, etc.) may provide technical advantages over single-tree models in some cases, such as decreasing the overall model variance to prevent over-fitting. Random forest, for example, may reduce variance by generating multiple decision trees, bootstrapping training samples, and randomly subsetting features considered for splitting/branching. Ensembling a group of decision trees may generally provide advantages for dealing with large feature spaces, outliers, and mixed-data types. Additionally, ensemble decision trees may take into account interactions between different input features without explicit feature engineering.

The input features provided to a trained decision tree model 115 or ensemble may include one or more user features characterizing the user, as described above, as well as the condition data that characterizes one or more conditions. The outputs from a trained decision tree model or ensemble 115 may include user specific predictions of user outcomes, which may be binary (e.g., a single value representing a positive outcome or a single value representing a negative outcome), or multiclass predictions (e.g., bins). In some implementations, user outcomes may be based on probability predictions, such as the probability of an attribute being associated with a positive user outcome for a particular user, based on the proportion of samples of a node in a decision tree and/or proportion of trees in an ensemble. Additionally, criteria hierarchies may be based on feature importance data generated by decision tree models 115. In some embodiments, data-driven rules and/or cut-offs may be implemented for input features.

In some implementations, the various splits of the decision tree can be tracked and stored to provide contextual information to user outcome predictions. As an example, for a particular user, the user features that contribute to the predicted user outcome can be identified and potentially presented to the user. If the decision tree illustrated in FIG. 7 represented a particular user, then the model server 110 can automatically identify that User Feature AAA, User Feature BBB, and Family Feature CCC all contributed to the user outcomes that were grouped into bin 1. The advantage of the decision tree model (and other models described herein) is that (1) the model output may be used to determine an incomplete subset of genes for a panel that is specific (e.g., best suited) for a particular user, (2) the user features specific to the user are inputted into the model, and (3) executing the model may result in the generation of intermediate values, which are used in the selecting of genes for the panel.

Logistic Regression Models

In certain embodiments, the trained machine learning models 115 may include one or more logistic regression models. Logistic regression models 115 may include segmentation models based on a logistic function. When logistic regression models 115 are implemented by a model server 110, the resulting model access and execution techniques may include additional technical advantages relating to the high level of interpretability and/or transparency of the outcome predictions from the trained models 115. Logistic regression models 115 may be linear models, which may vary impacts from various input features, and thus may not take into account more nuanced or non-linear trends of input features in some cases. For example, a nuanced trend such as a particular attribute (e.g., TP53) may be associated with a higher-value prediction of a user outcome (i.e., on a scale of values) only if a user feature of the user corresponds to a family history of cancer. This trend may be non-linear and may be detected and modeled during training of certain model types but might be ignored during a logistic regression training.

The input features provided to a trained logistic regression model 115 may include any user feature characterizing a user, as well as condition data characterizing one or more conditions. The outputs from a logistic regression model 115 may include user specific predictions of a user outcome, which may be binary (e.g., a single value representing a positive outcome or a single value representing a negative outcome), or multiclass predictions (e.g., attribute bins), as well as probability predictions of user outcomes. Additionally, outcomes from a logistic regression model 115 may include data identifying the contributions of each of the individual input features to the outcome prediction, including the magnitude, direction, and significance of such contributions. The model server 110 may calculate the contributions of the individual input features using the beta coefficients and p-values of each input feature. Thus, logistic regression models 115 may include further technical advantages of readily showing the impact of each of the input features on the output prediction, which may be advantageous for conflicting features (e.g., where some input features that increase the value of user outcomes and others that decrease the value of user outcomes, if a user outcome is a value on a scale of values).

Deep Learning Models

In some embodiments, the trained machine learning models 115 may include one or more deep learning models implemented using recurrent neural networks (RNNs). During the training of RNNs implemented within the model server 110, the RNN-based models may process and learn the mappings from sequential and/or longitudinal input data, such as user features that may change over time, to the appropriate user outcomes. Unlike machine learning models that are trained based on data snapshots at a particular point in time, RNN-based models 115 may be trained based on multiple instances of input data showing changes in the input data over time. Thus, during the training process for RNN models 115 by the model training system 116, the RNN model 115 may learn from both the input data and the sequence of changes in the input data. RNN models 115 thus have a memory that learns from time-based sequences of input data. Among other technical advantages, RNN models 115 may be configured compensate for missing input features and variable time intervals with minimal manual processing.

For RNN models 115, in additional to the other same input features discussed above for other models (e.g., user's personal and family health history data, etc.), the input data when training and accessing/executing RNN models 115 may include timestamp data for the input sequences indicating when the various input data fields were changed. The user outcome predictions from the RNN models 115 may be user specific, and may be binary predictions, multi-class predictions, and/or probability predictions as discussed above. Thus, RNN models 115 may provide the ability to detect hidden signals in multiple forms of longitudinal model inputs (e.g., protocol availability) which may change over time. The input data, including, for example, the changes over time of a user feature or the changes over time of condition data characterizing a condition, may be processed by the RNN models 115 to predict user outcomes.

In still other embodiments, the models generated and used to predict user specific user outcomes need not be AI-based or machine learning models as discussed in the above embodiments. For example, in some cases, a panel recommendation system may be implemented by the model server 110, to output panel recommendations based on previous feedback data and patterns from other similar users. In some embodiments, the server 110 may implement a panel recommendation system that receives and stores previous user outcomes for users, and then predicts or recommends user outcomes based on user similarities. In such embodiments, the models 115 may be trained using previously determined outcomes data from various other users. Once a user recommendation-based model is trained by a training system 116, it may be accessed/executed by an execution system 118 to predict user specific user outcomes based on similarities between new users and previous users or clusters of other users. After a model 115 is trained, it may predict user outcomes for users even when the user is missing data. The desired outcome data (e.g., user specific and predicted user outcomes) is likely be missing for the user because predictions of a panel for the user are likely to be made before the testing or sequencing has been performed.

Collaborative Filtering Models

In some cases, it may be difficult or impossible to train a recommendation-based model 115, without having previously determined user outcomes associated with a panel for the particular user. For instance, without having any user outcomes data, the model 115 may be unable to use other inputs like condition data characterizing a condition for panel recommendation to train the model 115. However, the server 110 may be configured to add "side information," such as clinical evidence from the literature, to guide how a recommendation-based model 115 may learns from the raw outcome data.

Figure 8:
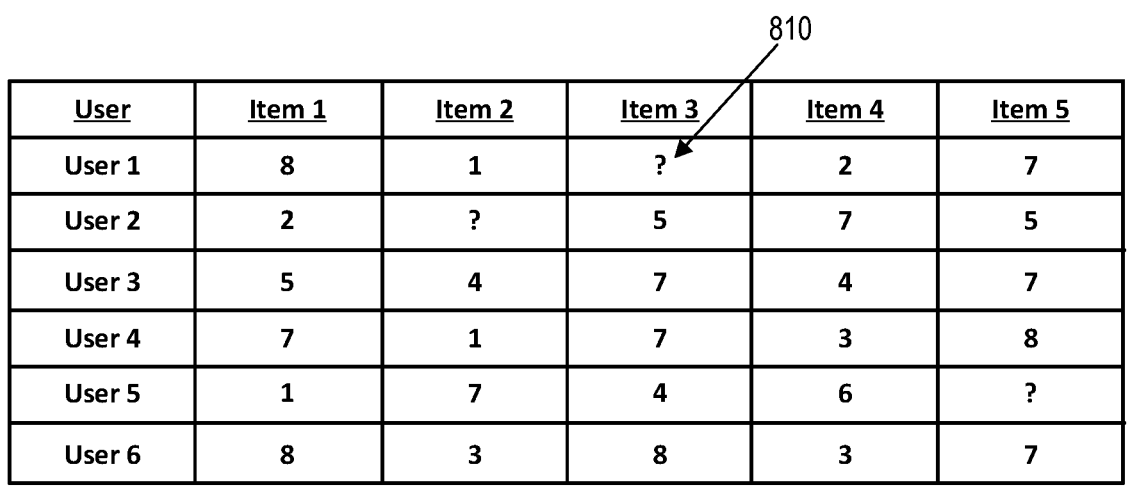
FIG. 8 is a table identifying outcome data for a plurality of users, according to aspects of the present disclosure.

An example data table from an item-based collaborative filtering system is shown in FIG. 8. In this example, a scale of values representing user outcomes is shown for six different users. Each number in the table in FIG. 8 may represent a user outcome for the associated user with respect to the Item (e.g., testing of particular gene). In some implementations, the user outcome for a user may be determined using certain embodiments described herein. In other implementations, the user outcome for a user may be manually entered by a user or by an individual on behalf of the user (e.g., a doctor). In FIG. 8, each "item" in a column may correspond to a user outcome resulting from a previous test of a particular gene or set of genes. In this example, if the model 115 were requested to predict the user outcome for User 1 with respect to Item 3 (810), the execution system 118 may analyze the data in the table to identify one or more other users with the most similar user outcomes for previous panel tests. In this example, the execution system 118 may determine that User 6 is the most similar to User 1 based on the previously determined user outcomes, and thus, the execution system 118 may generate an output predictive of User 1's user outcome for Item 3 (810) based on the user outcome associated with User 6 for Item 3. In other examples, multiple of the closest other users may be selected, and their user outcome values may be combined (e.g., averaged) to generate an output predictive of User 1's user outcome with respect to Item 3.

Although the collaborative filter data table shown in FIG. 8 provides a simple example to illustrate the concept, it should be understood that there are many different techniques and embodiments that may be implemented for collaborative filtering and/or for identifying "similar" users. For instance, a nearest neighbor technique may be implemented by the server 110, where a user similarity metric is calculated based on a distance in a domain space (e.g., Euclidean or cosine space) between user outcomes. Additionally, a matrix factorization technique may be used in some embodiments, in which the server 110 may calculate similarity by mapping features of user and health outcome rating, using a latent factor space. For example, the model execution system 118 may calculate user similarity using the equation $X=WH$, where $X=(observations)*(features)$, $W=(observations)*(latent\ features)$, and $H=(latent\ features)*(observed\ features)$. In some implementations, the collaborative filtering techniques may be performed in conjunction with any other modeling techniques described herein.

Executing Models and Determining the Highest-Value User Data

Figure 9:
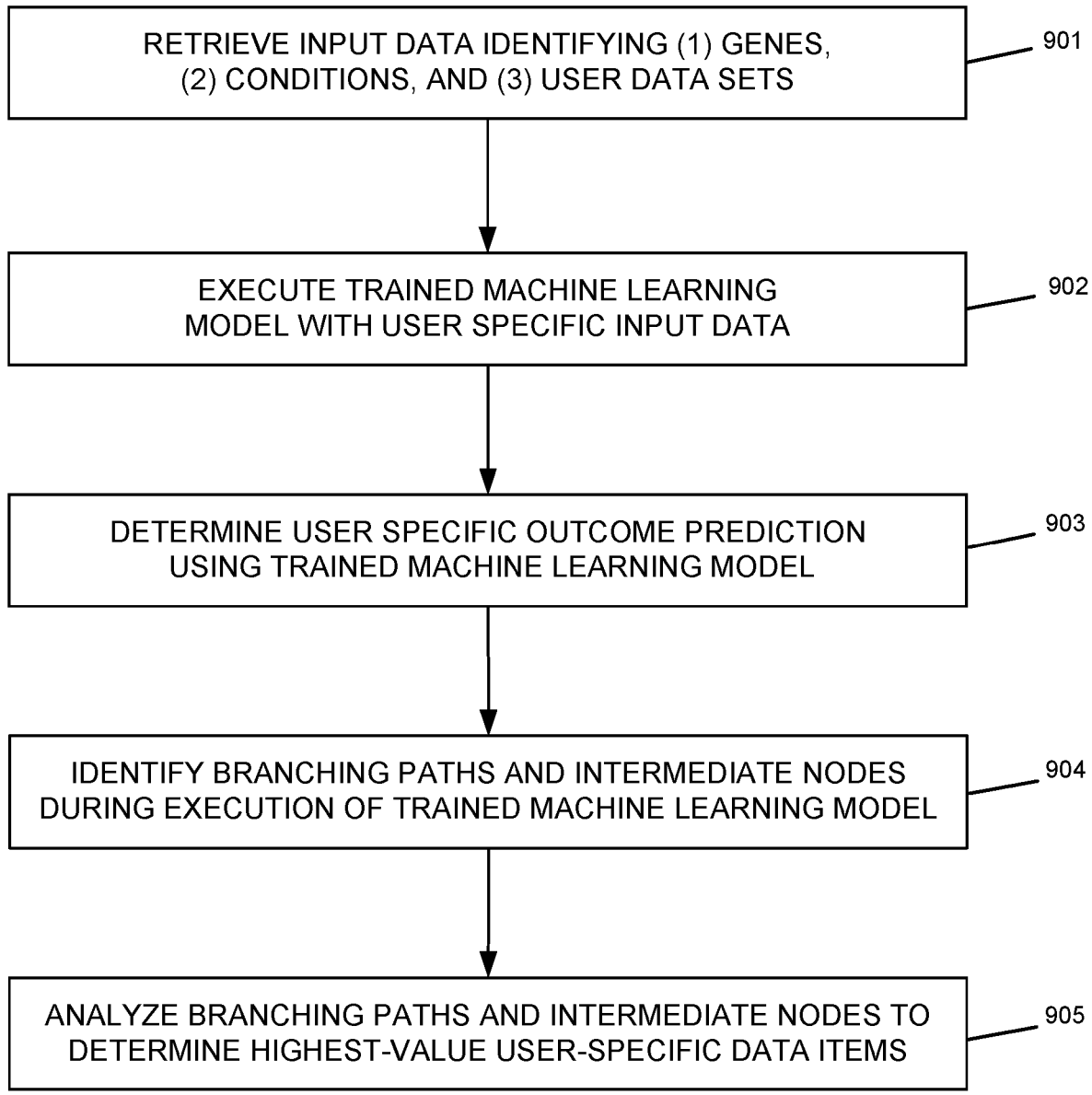
FIG. 9 is a flowchart illustrating a process of analyzing branching patterns and intermediate values during execution of a trained decision tree model, according to aspects of the present disclosure.

Referring now to FIG. 9, a flowchart is shown illustrating a process of analyzing branching patterns and intermediate outputs generated in response to executing a machine learning model to determine high-value user features. The techniques described below may include accessing and executing certain types of machine learning models 115 to determine user specific user outcomes, and then analyzing the execution of the models 115 to determine the most relevant (e.g., outcome determinative) user features. The features and steps described below, including receiving input data, accessing and executing trained models, and analyzing the execution of the trained models to determine the relevant input data, and the like, may be performed by the various devices operating within the computing environment 100, including the model execution system 118 of the model server 110. However, it should be understood that the techniques described in reference to FIG. 9 need not be tied to any particular devices or servers within the computing environment 100, but may be implemented by any computing systems and devices described or supported herein.

In step 901, the model server 110 may receive (and/or retrieve) all of the necessary input data to access and execute one or more machine learning models 115. For example, the data received in step 901 may include genes, conditions, and user features of a user data set. Thus, the functionality performed by the server 110 in step 901 may be similar or identical that performed in steps 301-303 discussed above.

In step 902, the server 110 may access and execute one or more trained machine learning models 115, providing as input to the models the various data received in step 901. Thus, step 902 may include similar or identical functionality to that described above for step 405. For example, a model execution system 118 may identify and access an appropriate trained model 115, provide the input data to the trained model 115, and then receive the outcome result from the trained model 115, which may correspond to a user specific user outcome for a particular gene. However, as discussed in more detail below, the trained model(s) 115 accessed in step 902 might be limited to only specific types of transparent models, such as decision tree models and logistic regression models. Transparent models may refer to models in which the model execution system 118 is able to determine which specific input data features caused the particular outcome from the model. For instance, during the execution of a decision tree such as the one shown in FIG. 7, the model execution system 118 may be aware of each intermediate value and branching path taken between the top-level node and the final leaf-node corresponding to the outcome. Thus, the machine learning model 115 accessed and executed in step 902 may be a transparent model such as a decision tree model, a recurrent neural network model, or a logistic regression model.

In step 903, the execution of the trained model 115 may be completed, and one or more outputs may be generated. The one or more outputs may be evaluated to predict a user outcome. The predicted user outcome may be stored at the server 110 of any of repositories 130. As discussed above, the predicted user outcome may be specific to a user and gene. The output of the trained model 115 may be binary (e.g., positive user outcome, unknown user outcome, or potentially negative user outcome), or multiclass predictions (e.g., bins). Probability predictions may also be used to predict user outcomes.

In step 904, while the trained model 115 is being accessed/executed to determine the user outcomes specific to a particular user, the model execution system 118 also may analyze the model execution and identify the various branching paths, intermediate values, or other specific input data that contributed to a particular output in step 903. For instance, in the decision tree model shown in FIG. 7, the model execution system 118 may track and store data identifying each decision point, branching path, and intermediate value between the top-level node and the final leaf node. In this example, the model execution system 118 may determine that the User Features AAA, BBB, and FFF (e.g., age, weight, the family feature CCC, the medication feature DDD, and the medical feature EEE and GGG as each being outcome determinative to the final output of the model. For instance, these user features may be any information characterizing a user. The family features may correspond to any of the specific family history data discussed above (e.g., family instances of diseases, disorders, traits, characteristics, etc.). The medical features and medication features may correspond to any of the specific medical data and medication usage data discussed above. In some cases, the server 110 may analyze one or multiple executions of the models 115, and may determine not only which of the user features may affect the output of the model, as well as which of the user features is the most outcome-determinative for determining the one or more predicted user outcomes of the model 115. For instance, in certain decision trees the data factors that cause branching near the top of the decision tree structure may be considered more outcome determinative than other data factors that cause branching near the bottom of the structure. Similarly, for logistic regression, RNN, and other transparent models, that data factors that are processes/considered first during the model execution may have a greater effect on the output of the model.

In step 905, the branching paths, intermediate values, and/or any other data determined in step 904 to be responsible for driving the result of model 115, may be analyzed to determine the highest-value user data items. In some embodiments, the analyses in step 905 may aggregate the data identifying which user features were the most relevant/most outcome determinative, over multiple different executions of a single model 115 and/or over multiple different executions of several different models. As discussed above, trained models 115 may include several different individual machine learning models 115 configured to provide user specific user outcomes for various genes and conditions. Thus, determining the highest-value user features in step 905 may include summing or averaging the value of the data item across multiple different models 115.

The determination of the highest-value user data items in step 905 may be used, for example, to design surveys, to run outcome scenarios for user with incomplete medical data, or to run alternative scenarios (e.g., if the user could change one user feature). For instance, surveys, interviews, user interfaces, and other user interactions may be optimized to request the highest-value user feature first. Additionally, in some cases, user specific user outcomes and/or user specific panel recommendations also may be based on the determination of the highest-value user features in step 905. For example, if a user's data is incomplete or unavailable (e.g., some or all of the family medical history is missing), then the server 110 may determine for which of the trained machine learning models 115 the missing user data is the highest-value or most outcome determinative. The model execution system 118 then may determine that different sets of trained models 115 should be used instead for the panel recommendation, where the missing user data is less valuable. Thus, the execution of different trained models 115 (e.g., corresponding to different model types) may affect the resulting user specific panel recommendation.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed is:

1. A computer-implemented method, comprising:
receiving, at a server, a first communication corresponding to a request to identify a gene panel that is specific to a user;
in response to receiving the first communication, generating a second communication responsive to the request to identify the gene panel that is specific to the user, wherein identifying the gene panel includes:
identifying a set of genes, each gene of the set of genes being associated with one or more diseases, and each disease of the one or more diseases being associated with one or more treatments;
accessing a user data set associated with the user, the user data set including two or more user feature values, each user feature value of the two or more user feature values characterizing an aspect of the user;
generating an input data set that includes the user data set;
inputting the input data set into a trained machine learning model, the trained machine learning model having been trained using a training data set associated with a plurality of other users;
processing the input data set using the trained machine learning model, wherein the processing includes executing the machine learning model multiple times, and wherein each of the executions uses user-specific data and wherein each of the executions generates:
a set of intermediate values, each intermediate value of the set of intermediate values representing a computed value determined using:
a set of real user attributes from the input data set and at least one estimated user attribute; and
at least one parameter of the trained machine learning model, wherein at least some of the set of intermediate values corresponds to the set of genes, wherein the computed value represented by one or more of the set of intermediate values is determined based on the at least one estimated user attribute that corresponds to a user attribute that is missing from the user data set; and
an output corresponding to a prediction of whether or a degree to which an expected event of a particular disease of the one or more diseases is modifiable performing, on the user, a particular treatment of the one or more treatments;
determining, based at least in part on the executions of the machine learning model, that one or more particular user attributes are predictive of an output corresponding to a personalized prediction that treating the user with the particular treatment will positively modify the particular disease; and
selecting a subset of genes from amongst the set of genes to include in the gene panel specific to the user based on the one or more particular user attributes; and
transmitting the second communication in response to receiving the first communication.

2. The computer-implemented method of claim 1, further comprising:
performing a clustering operation on the training data set, the performance of the clustering operation forming one or more clusters of users, each cluster of the one or more clusters representing one or more users of the plurality of other users that share a common user feature value;
calculating a similarity metric between the user and the one or more users of each cluster of the one or more clusters, the similarity metric being calculated by mapping the two or more user feature values characterizing the user to each cluster of the one or more clusters; and
selecting the subset based on at least a portion of the training data set that corresponds to a cluster associated with a highest similarity metric.

3. The computer-implemented method of claim 2, wherein the similarity metric is calculated using one or more collaborative filtering techniques.

4. The computer-implemented method of claim 1, wherein the trained machine learning model is a decision tree model, wherein processing the input data set using the decision tree model results in generating one or more feature nodes, each feature node of the one or more feature nodes being associated with an expected value learned during training, and wherein the expected value associated with each feature node of the one or more feature nodes being an intermediate value of the one or more intermediate values.

5. The computer-implemented method of claim 1, further comprising:
accessing an additional input data set corresponding to an additional user, an additional gene of the subset of genes, and an additional disease of the one or more diseases associated with the additional gene;
inputting the additional input data set into the trained machine learning model;
processing the additional input data set using the trained machine learning model;
generating an additional output in response to processing the additional input data set using the trained machine learning model; and
selecting an additional subset of the set of genes, wherein the additional subset is selected based on the additional output generated by the trained machine learning model, and wherein the additional subset includes one or more genes that are different from the subset associated with the user.

6. The computer-implemented method of claim 1, further comprising:
generating the training data set by:
retrieving a first data set representing one or more previously determined treatment outcome variables associated with each of the plurality of other users, each previously determined treatment outcome variable of the one or more previously determined treatment outcome variables indicating an outcome of performing a treatment on a user of the plurality of other users;
retrieving a second data set representing one or more previously determined measurement variables associated with each of the plurality of other users, each previously determined measurement variable of the one or more previously determined measurement variables indicating a measured data point associated with a user of the plurality of other users; and
combining each of the first data set and the second data set into the training data set.

7. The computer-implemented method of claim 1, further comprising:
identifying the gene panel specific to the user based on the subset, the gene panel being used for testing a likelihood that the user will develop the particular disease.

8. The computer-implemented method of claim 1, wherein the trained machine learning model includes a recurrent neural network.

9. The computer-implemented method of claim 1, further comprising:
selecting the trained machine learning model from among multiple trained machine learning models based on which variables represented in the input data set values are available in the input data set.

10. The computer-implemented method of claim 9, wherein the multiple trained machine learning models includes a collaborative filtering model.

11. A system, comprising:
one or more processors; and
a non-transitory computer-readable storage medium containing instructions which, when executed on the one or more processors, cause the one or more processors to perform operations including:
receiving, at a server, a first communication corresponding to a request to identify a gene panel that is specific to a user;
in response to receiving the first communication, generating a second communication responsive to the request to identify the gene panel that is specific to the user, wherein identifying the gene panel includes:
identifying a set of genes, each gene of the set of genes being associated with one or more diseases, and each disease of the one or more diseases being associated with one or more treatments;
accessing a user data set associated with the user, the user data set including two or more user feature values, each user feature value of the two or more user feature values characterizing an aspect of the user;
generating an input data set that includes the user data set;
inputting the input data set into a trained machine learning model, the trained machine learning model having been trained using a training data set associated with a plurality of other users;
processing the input data set using the trained machine learning model, wherein the processing includes executing the machine learning model multiple times, and wherein each of the executions uses user-specific data and wherein each of the executions generates:
a set of intermediate values, each intermediate value of the set of intermediate values representing a computed value determined using:
a set of real user attributes from the input data set and at least one estimated user attribute; and
at least one parameter of the trained machine learning model, wherein at least some of the set of intermediate values corresponds to the set of genes, wherein the computed value represented by one or more of the set of intermediate values is determined based on the at least one estimated user attribute that corresponds to a user attribute that is missing from the user data set; and
an output corresponding to a prediction of whether or a degree to which an expected event of a particular disease of the one or more diseases is modifiable performing, on the user, a particular treatment of the one or more treatments;
determining, based at least in part on the executions of the machine learning model, that one or more particular user attributes are predictive of an output corresponding to a personalized prediction that treating the user with the particular treatment will positively modify the particular disease; and
selecting a subset of genes from amongst the set of genes to include in the gene panel specific to the user based on the one or more particular user attributes; and
transmitting the second communication in response to receiving the first communication.

12. The system of claim 11, wherein the operations further comprise:
performing a clustering operation on the training data set, the performance of the clustering operation forming one or more clusters of users, each cluster of the one or more clusters representing one or more users of the plurality of other users that share a common feature;
calculating a similarity metric between the user and the one or more users of each cluster of the one or more clusters, the similarity metric being calculated by mapping the one or more features characterizing the user to each cluster of the one or more clusters; and
selecting the subset based on at least a portion of the training data set that corresponds to a cluster associated with a highest similarity metric.

13. The system of claim 12, wherein the similarity metric is calculated using one or more collaborative filtering techniques.

14. The system of claim 11, wherein the trained machine learning model is a decision tree model, wherein processing the user data set using the decision tree model results in generating one or more feature nodes, each feature node of the one or more feature nodes being associated with an expected value learned during training.

15. The system of claim 11, wherein the operations further comprise:
accessing an additional input data set corresponding to an additional user, an additional gene of the subset of genes, and an additional disease of the one or more diseases associated with the additional gene;
inputting the additional input data set into the trained machine learning model;
processing the additional input data set using the trained machine learning model;
generating an additional output in response to processing the additional input data set using the trained machine learning model; and
selecting an additional subset of the set of genes, wherein the additional subset is selected based on the additional output generated by the trained machine learning model, and wherein the additional subset includes one or more genes that are different from the subset associated with the user.

16. The system of claim 11, wherein the operations further comprise:
generating the training data set by:
retrieving a first data set representing one or more previously determined treatment outcome variables associated with each of the plurality of other users, each previously determined treatment outcome variable of the one or more previously determined treatment outcome variables indicating an outcome of performing a treatment on a user of the plurality of other users;
retrieving a second data set representing one or more previously determined measurement variables associated with each of the plurality of other users, each previously determined measurement variable of the one or more previously determined measurement variables indicating a measured data point associated with a user of the plurality of other users; and
combining each of the first data set and the second data set into the training data set.

17. The system of claim 11, wherein the operations further comprise:
  identifying a panel specific to the user based on the subset, the panel being used for testing a likelihood that the user will develop the particular disease.

18. A computer-program product tangibly embodied in a non-transitory machine-readable storage medium, including instructions configured to cause a processing apparatus to perform operations including:
  receiving, at a server, a first communication corresponding to a request to identify a gene panel that is specific to a user;
  in response to receiving the first communication, generating a second communication responsive to the request to identify the gene panel that is specific to the user, wherein identifying the gene panel includes:
  identifying a set of genes, each gene of the set of genes being associated with one or more diseases, and each disease of the one or more diseases being associated with one or more treatments;
  accessing a user data set associated with the user, the user data set including two or more user feature values, each user feature value of the two or more user feature values characterizing an aspect of the user;
  generating an input data set that includes the user data set;
  inputting the input data set into a trained machine learning model, the trained machine learning model having been trained using a training data set associated with a plurality of other users;
  processing the input data set using the trained machine learning model, wherein the processing includes executing the machine learning model multiple times, and wherein each of the executions uses user-specific data and wherein each of the executions generates:
  a set of intermediate values, each intermediate value of the set of intermediate values representing a computed value determined using:
  a set of real user attributes from the input data set and at least one estimated user attribute; and
  at least one parameter of the trained machine learning model, wherein at least some of the set of intermediate values corresponds to the set of genes, wherein the computed value represented by one or more of the set of intermediate values is determined based on the at least one estimated user attribute that corresponds to a user attribute that is missing from the user data set; and
  an output corresponding to a prediction of whether or a degree to which an expected event of a particular disease of the one or more diseases is modifiable performing, on the user, a particular treatment of the one or more treatments;
  determining, based at least in part on the executions of the machine learning model, that one or more particular user attributes are predictive of an output corresponding to a personalized prediction that treating the user with the particular treatment will positively modify the particular disease; and
  selecting a subset of genes from amongst the set of genes to include in the gene panel specific to the user based on the one or more particular user attributes; and
  transmitting the second communication in response to receiving the first communication.

19. The computer-program product of claim 18, wherein the operations further comprise:
  performing a clustering operation on the training data set, the performance of the clustering operation forming one or more clusters of users, each cluster of the one or more clusters representing one or more users of the plurality of other users that share a common feature;
  calculating a similarity metric between the user and the one or more users of each cluster of the one or more clusters, the similarity metric being calculated by mapping the one or more features characterizing the user to each cluster of the one or more clusters; and
  selecting the subset based on at least a portion of the training data set that corresponds to a cluster associated with a highest similarity metric.

20. The computer-program product of claim 19, wherein the similarity metric is calculated using one or more collaborative filtering techniques.

21. The computer-program product of claim 18, wherein the trained machine learning model is a decision tree model, wherein processing the user data set using the decision tree model results in generating one or more feature nodes, each feature node of the one or more feature nodes being associated with an expected value learned during training.

22. The computer-program product of claim 18, wherein the operations further comprise:
  accessing an additional input data set corresponding to an additional user, an additional gene of the subset of genes, and an additional disease of the one or more diseases associated with the additional gene;
  inputting the additional input data set into the trained machine learning model;
  processing the additional input data set using the trained machine learning model;
  generating an additional output in response to processing the additional input data set using the trained machine learning model; and
  selecting an additional subset of the set of genes, wherein the additional subset is selected based on the additional output generated by the trained machine learning model, and wherein the additional subset includes one or more genes that are different from the subset associated with the user.

23. The computer-program product of claim 18, wherein the operations further comprise:
  generating the training data set by:
  retrieving a first data set representing one or more previously determined treatment outcome variables associated with each of the plurality of other users, each previously determined treatment outcome variable of the one or more previously determined treatment outcome variables indicating an outcome of performing a treatment on a user of the plurality of other users;
  retrieving a second data set representing one or more previously determined measurement variables associated with each of the plurality of other users, each previously determined measurement variable of the one or more previously determined measurement variables indicating a measured data point associated with a user of the plurality of other users; and
  combining each of the first data set and the second data set into the training data set.

* * * * *